United States Patent
Taniguchi et al.

(10) Patent No.: US 12,319,855 B2
(45) Date of Patent: Jun. 3, 2025

(54) BLOCK COPOLYMER, POLYMER COMPOSITION, COMPOSITION FOR VISCOUS ADHESIVE, VISCOUS ADHESIVE COMPOSITION, AND COUPLING AGENT

(71) Applicant: Asahi Kasei Kabushiki Kaisha, Tokyo (JP)

(72) Inventors: Naoki Taniguchi, Tokyo (JP); Ippei Kameda, Tokyo (JP); Masato Yamada, Tokyo (JP); Hitoshi Yamamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1013 days.

(21) Appl. No.: 16/968,190

(22) PCT Filed: Jan. 28, 2019

(86) PCT No.: PCT/JP2019/002720
§ 371 (c)(1),
(2) Date: Aug. 7, 2020

(87) PCT Pub. No.: WO2019/155926
PCT Pub. Date: Aug. 15, 2019

(65) Prior Publication Data
US 2021/0371710 A1    Dec. 2, 2021

(30) Foreign Application Priority Data
Feb. 9, 2018    (JP) .................................. 2018-022184

(51) Int. Cl.
| | |
|---|---|
| *C09J 7/38* | (2018.01) |
| *C08F 8/00* | (2006.01) |
| *C08F 8/46* | (2006.01) |
| *C08F 297/04* | (2006.01) |
| *C08L 53/02* | (2006.01) |
| *C09J 11/06* | (2006.01) |
| *C09J 11/08* | (2006.01) |
| *C09J 153/02* | (2006.01) |

(52) U.S. Cl.
CPC ............... *C09J 7/387* (2018.01); *C08F 8/00* (2013.01); *C08F 8/46* (2013.01); *C08F 297/044* (2013.01); *C08L 53/025* (2013.01); *C09J 11/06* (2013.01); *C09J 11/08* (2013.01); *C09J 153/02* (2013.01); *C09J 153/025* (2013.01); *C09J 2301/302* (2020.08); *C09J 2301/408* (2020.08); *C09J 2453/00* (2013.01); *C09J 2467/006* (2013.01); *C09J 2491/00* (2013.01)

(58) Field of Classification Search
CPC .......... C08F 297/044; C08F 8/46; C08F 8/00; C08L 53/025; C09J 7/387; C09J 11/08; C09J 153/02; C09J 11/06; C09J 153/025; C09J 2301/408; C09J 2301/302; C09J 2453/00; C09J 2467/006; C09J 2491/00
See application file for complete search history.

(56) References Cited

U.S. PATENT DOCUMENTS

| | | | |
|---|---|---|---|
| 3,668,279 | A | 6/1972 | Loveless et al. |
| 5,270,396 | A | 12/1993 | Farrar, Jr. et al. |

(Continued)

FOREIGN PATENT DOCUMENTS

| | | |
|---|---|---|
| CN | 105934445 A | 9/2016 |
| EP | 0464847 A2 | 1/1992 |
| EP | 2878644 A | 6/2015 |

(Continued)

OTHER PUBLICATIONS

International Search Report issued in corresponding International Patent Application No. PCT/JP2019/002720 dated Apr. 23, 2019.
International Preliminary Report on Patentability and Written Opinion issued in corresponding International Patent Application No. PCT/JP2019/002720 dated Aug. 20, 2020.
Supplementary European Search Report issued in corresponding European Patent Application No. 19750561.3 dated Nov. 30, 2020.

*Primary Examiner* — Patrick D Niland
(74) *Attorney, Agent, or Firm* — Morgan, Lewis & Bockius LLP

(57) ABSTRACT

A block copolymer comprising
a polymer block (A) mainly comprising a vinyl aromatic monomer unit, and
a polymer block (B) mainly comprising a conjugated diene monomer unit,
the block copolymer being represented by the following general formula (1) or (2):

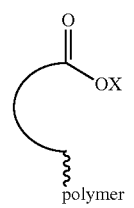

(1)

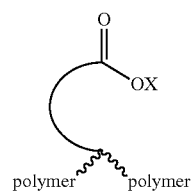

(2)

wherein each curved portion represents a saturated or unsaturated hydrocarbon group having 1 to 20 carbon atoms which is unsubstituted or optionally has a substituent, X represents a group 1 element, and "polymer" represents a polymer moiety.

18 Claims, No Drawings

(56) References Cited

U.S. PATENT DOCUMENTS

| | | | |
|---|---|---|---|
| 6,150,463 | A | 11/2000 | Lanza et al. |
| 2017/0002190 | A1 | 1/2017 | Hisasue et al. |

FOREIGN PATENT DOCUMENTS

| | | | |
|---|---|---|---|
| JP | S61-261310 A | | 11/1986 |
| JP | S61-278578 A | | 12/1986 |
| JP | H04-226519 A | | 8/1992 |
| JP | H11-335433 A | | 12/1999 |
| JP | 2000-309767 A | | 11/2000 |
| JP | 2006-095966 A | | 4/2006 |
| JP | 2013-100448 A | | 5/2013 |
| JP | 2013-144743 A | | 7/2013 |
| WO | WO 02/50228 | * | 6/2002 |

* cited by examiner

BLOCK COPOLYMER, POLYMER COMPOSITION, COMPOSITION FOR VISCOUS ADHESIVE, VISCOUS ADHESIVE COMPOSITION, AND COUPLING AGENT

TECHNICAL FIELD

The present invention relates to a block copolymer, a polymer composition, a composition for a viscous adhesive, a viscous adhesive composition, and a coupling agent.

BACKGROUND ART

For purposes such as sheets or films, many attempts to confer sufficient strength, to improve workability, or to reduce product cost have heretofore been made by using a composition consisting of a plurality of components including a polymer substance supplemented with additional components, or by preparing a laminate thereof.

Also, attempts to improve strength have been made by adding a tackifier to a polymer substance for viscous adhesive purposes, or by adding a polymer substance to asphalt for the purpose of modifying asphalt.

Materials that are used for these purposes are usually required to achieve both low viscosity and high mechanical strength.

In recent years, vinyl aromatic monomer-conjugated diene monomer block copolymers (e.g., SBS: styrene-butadiene-styrene block copolymer and SIS: styrene-isoprene-styrene block copolymer) have been widely used as base polymers for solution-type and hot-melt-type adhesives or pressure-sensitive adhesives.

For example, Patent Document 1 discloses a polymer composition for adhesives or for pressure-sensitive adhesives containing SBS.

However, unfortunately, such a polymer composition for adhesives or for pressure-sensitive adhesives containing SBS or SIS has insufficient balance between workability and viscous adhesive characteristics such as peel strength, and exhibits elevated melt viscosity leading to deteriorated workability in an attempt to obtain high viscous adhesive characteristics.

For techniques of improving such balance between workability and viscous adhesive characteristics, Patent Document 2 discloses a polymer composition for adhesives containing a triblock copolymer and a diblock copolymer.

Patent Document 3 discloses a polymer composition for a viscous adhesive, comprising two or more block copolymer compositions.

LIST OF PRIOR ART DOCUMENTS

Patent Document
  Patent Document 1: Japanese Patent Publication No. 61-278578
  Patent Document 2: Japanese Patent Laid-Open No. 61-261310
  Patent Document 3: Japanese Patent Laid-Open No. 2000-309767

SUMMARY OF INVENTION

Problems to be Solved by Invention

However, the previously disclosed polymer compositions have insufficient tensile physical properties. The polymer compositions disclosed in Patent Documents 1 to 3 are insufficiently effective for improving the balance between workability and viscous adhesive characteristics. Therefore, there is a demand for further improvement.

Accordingly, the present invention has been made in light of the problems of the conventional techniques mentioned above, and an object of the present invention is to provide a block copolymer that produces a polymer composition excellent in tensile physical properties and excellent in workability, i.e., the balance between low viscosity and viscous adhesive characteristics, a polymer composition comprising the block copolymer, and a viscous adhesive composition comprising the polymer composition.

Means for Solving Problems

The present inventors have conducted diligent studies to solve the problems of the conventional techniques mentioned above, and consequently completed the present invention by finding that a block copolymer having a specific structure can effectively solve the problems.

Specifically, the present invention is as follows.

[1]

A block copolymer comprising
  a polymer block (A) mainly comprising a vinyl aromatic monomer unit, and
  a polymer block (B) mainly comprising a conjugated diene monomer unit,
  the block copolymer being represented by the following general formula (1) or (2):

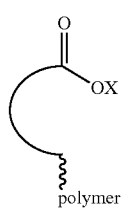

(1)

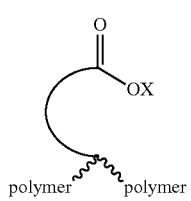

(2)

wherein each curved portion represents a saturated or unsaturated hydrocarbon group having 1 to 20 carbon atoms which is unsubstituted or optionally has a substituent, X represents a group 1 element, and "polymer" represents a polymer moiety.

[2]

A block copolymer comprising
  a polymer block (A) mainly comprising a vinyl aromatic monomer unit, and
  a polymer block (B) mainly comprising a conjugated diene monomer unit, the block copolymer being represented by the following general formula (A1) or (A2):

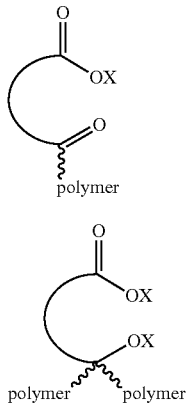

wherein each curved portion represents a saturated or unsaturated hydrocarbon group having 1 to 20 carbon atoms which is unsubstituted or optionally has a substituent, X represents a group 1 element, and "polymer" represents a polymer moiety.

[3]

The block copolymer according to [1] or [2], wherein the block copolymer comprises the polymer block (A) mainly comprising a vinyl aromatic monomer unit and the polymer block (B) mainly comprising a conjugated diene monomer unit and is represented by the following formula (a) and/or (b):

$(A-B)_n—Y'$ (a) 

$(B-A-B)\sim_a—Y'$ (b) 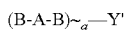

wherein n represents an integer of 1 to 4, and Y' represents a coupling agent residue from coupling of the block copolymer using a coupling agent having a structure represented by the following formula (Y1) or (Y2):

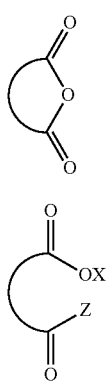

wherein each curved portion represents a saturated or unsaturated hydrocarbon group having 1 to 20 carbon atoms which is unsubstituted or optionally has a substituent, Z represents a functional group eliminable through coupling reaction, and X represents a group 1 element.

[4]

A polymer composition comprising the block copolymer according to any one of [1] to [3].

[5]

The polymer composition according to [4], further comprising a polymer represented by the following general formula (3), and/or a polymer represented by the following general formula (4):

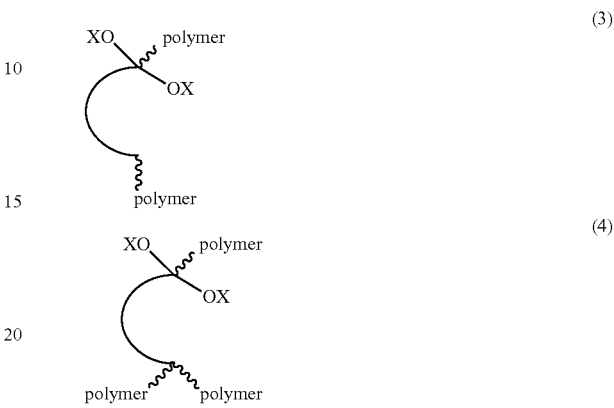

wherein each curved portion represents a saturated or unsaturated hydrocarbon group having 1 to 20 carbon atoms which is unsubstituted or optionally has a substituent, X represents a group 1 element, and "polymer" represents a polymer moiety.

[6]

The polymer composition according to [4] or [5], wherein a content of the vinyl aromatic monomer unit in the polymer composition is 5 to 60% by mass.

[7]

The polymer composition according to any one of [4] to [6], wherein
the polymer composition comprises at least one block copolymer in a monobranched form represented by the general formula (1), or at least one block copolymer in a monobranched form represented by the general formula (a) or (b) wherein n is 1, wherein
a number-average molecular weight of the block copolymer in a monobranched form is 150,000 or lower.

[8]

The polymer composition according to [7], wherein a content of the block copolymer in the monobranched form is 10% by mass to 90% by mass.

[9]

The polymer composition according to any one of [4] to [8], wherein a viscosity at 25° C. of a solution of 25% by mass of the polymer composition in toluene is 250 mPa·s or lower.

[10]

The polymer composition according to any one of [4] to [9], wherein a viscosity at 25° C. of a solution of 15% by mass of the polymer composition in toluene is 40 mPa·s or lower.

[11]

A composition for a viscous adhesive, comprising the polymer composition according to any one of [4] to [10].

[12]

The composition for the viscous adhesive according to [11], wherein the composition contains
polymer composition C1 according to any one of [4] to [10], and
a polymer other than polymer composition C1 and/or polymer composition C2.

[13]
A viscous adhesive composition comprising
100 parts by mass of the composition for the viscous adhesive according to [11] or [12],
50 to 400 parts by mass of a tackifier, and
10 to 150 parts by mass of a softener.

[14]
A coupling agent to be reacted with a polymer comprising at least a conjugated diene monomer unit,
the coupling agent being represented by the following general formula (Y1) or (Y2):

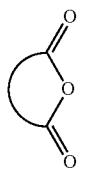

(Y1)

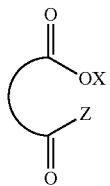

(Y2)

wherein each curved portion represents a saturated or unsaturated hydrocarbon group having 1 to 20 carbon atoms which is unsubstituted or optionally has a substituent, Z represents a functional group eliminable through coupling reaction, and X represents a group 1 element.

Advantages of Invention

The present invention can provide a block copolymer that produces a polymer composition excellent in tensile physical properties, and a viscous adhesive composition excellent in workability, i.e., the balance between low viscosity and viscous adhesive characteristics, a polymer composition comprising the block copolymer, and a composition for a viscous adhesive and a viscous adhesive composition containing the polymer composition.

MODE FOR CARRYING OUT INVENTION

Hereinafter, the mode for carrying out the present invention (hereinafter, referred to as the "present embodiment") will be described in detail. The present embodiment described below is given for merely illustrating the present invention, and is not intended to limit the present invention by the contents described below. The present invention can be carried out by making various changes or modifications without departing from the spirit of the present invention.

[Block Copolymer]
(Block Copolymer of First Embodiment)
The block copolymer of the present embodiment is a block copolymer of the first embodiment comprising a polymer block (A) mainly comprising a vinyl aromatic monomer unit, and a polymer block (B) mainly comprising a conjugated diene monomer unit, the block copolymer being represented by the following general formula (1) or (2):

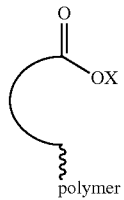

(1)

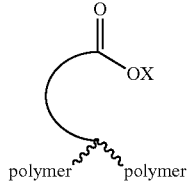

(2)

(Block Copolymer of Second Embodiment)
The block copolymer of the present embodiment is a block copolymer of the second embodiment comprising a polymer block (A) mainly comprising a vinyl aromatic monomer unit, and a polymer block (B) mainly comprising a conjugated diene monomer unit, the block copolymer being represented by the following general formula (A1) or (A2):

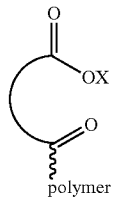

(A1)

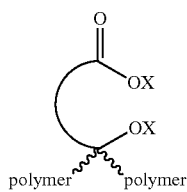

(A2)

In the general formulas (1), (2), (A1), and (A2), each curved portion represents a saturated or unsaturated hydrocarbon group having 1 to 20 carbon atoms which is unsubstituted or optionally has a substituent. X represents a group 1 element.

In the general formulas (1), (2), (A1), and (A2), "polymer" represents a polymer moiety. A production method is not particularly limited. A production method of preparing "polymer" by polymerization, and reacting a coupling agent with an active end of the polymer to form a structure represented by the general formula (1), (2), (A1), or (A2) is a practically preferred production method.

The presence of the polymer block (A) mainly comprising a vinyl aromatic monomer unit, as compared with the absence thereof, improves the mechanical physical properties (tensile characteristics) of the polymer composition of the present embodiment, improves the holding power of a viscous adhesive composition containing the block copolymer of the present embodiment, and improves the balance between the holding power and the melt viscosity thereof.

"1 to 20 carbon atoms" of the curved portion represent the length of the backbone of saturated hydrocarbon or unsaturated hydrocarbon. Too large a number of carbon atoms is not preferred in terms of cost because coupling efficiency based on the amount of a coupling agent added is reduced.

When the curved portion has a substituent, this substituent may be one or more substituents. The substituent preferably has 1 to 20 carbon atoms. If the substituent has more than 20 carbon atoms and is too large, the polymer is less likely to meet a coupling agent due to large steric hindrance; thus, coupling reaction tends to be slow.

When the substituent is a saturated or unsaturated hydrocarbon group, this hydrocarbon group may be independent or may form a ring structure. When the substituent is a functional group, it may be preferred to have interaction through a hydrogen bond with an intramolecular carbonyl group. Therefore, the substituent can be appropriately selected in consideration of interaction with a carboxyl group, etc. Preferred examples of the substituent include a hydroxy group, a carboxyl group, an epoxy group, an amino group, a silanol group and an alkoxysilyl group.

The block copolymer having the structure represented by the general formula (1), (2), (A1), or (A2) contains, in the molecule, a functional group capable of forming a complementary association state through a hydrogen bond. Therefore, the block copolymer having the structure represented by the general formula (1), (2), (A1), or (A2) is considered to effectively form a hydrogen bond with a molecule other than oneself at room temperature and easily behave as a molecule apparently having a large molecular weight. Hence, the presence of such a structure, as compared with the absence thereof, tends to improve tensile physical properties.

This also tends to improve the holding power of a viscous adhesive composition containing the block copolymer of the present embodiment. Meanwhile, since the hydrogen bond is cleaved at a high temperature, the block copolymer easily behaves as a relatively small molecule at the time of melt flow rate measurement or under high-temperature conditions capable of melting the viscous adhesive composition, as compared with room temperature conditions; thus, melt viscosity tends to be reduced.

For these reasons, the block copolymer of the present embodiment can be preferably used for purposes, such as sheets or films, required to achieve both high tensile physical properties and high melt flow rate, and for viscous adhesive composition purposes required to achieve both high holding power and low viscosity of a viscous adhesive composition.

The block copolymer of the general formula (1) or (A1) is preferably a block copolymer represented by the general formula (I) given below. The block copolymer of the general formula (2) or (A2) is preferably a block copolymer represented by the general formula (II) given below. These structures tend to be able to more efficiently form a hydrogen bond.

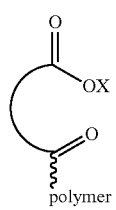

(I)

-continued

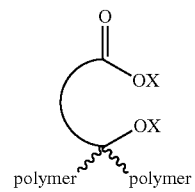

(II)

In the general formulas (I) and (II), each curved portion represents a saturated or unsaturated hydrocarbon group having 1 to 20 carbon atoms which is unsubstituted or optionally has a substituent. X represents a group 1 element.

In the general formulas (I) and (II), "polymer" represents a polymer moiety.

The block copolymer of the general formula (1) or (A1) is preferably a block copolymer represented by the general formula (i) given below from the viewpoint of easy production. Likewise, the block copolymer of the general formula (2) or (A2) is preferably a block copolymer represented by the general formula (ii) given below.

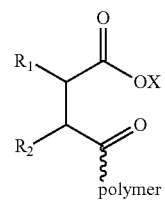

(i)

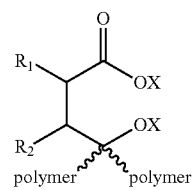

(ii)

In the formulas (i) and (ii), $R_1$ and $R_2$ each represent hydrogen or a saturated or unsaturated hydrocarbon group having 1 to 20 carbon atoms which is unsubstituted or optionally has a substituent, and $R_1$ and $R_2$ may be independent from each other or may together form a ring structure. X represents a group 1 element.

In the general formulas (i) and (ii), "polymer" represents a polymer moiety.

As mentioned above, the block copolymer of the present embodiment is a block copolymer comprising a polymer block (A) mainly comprising a vinyl aromatic monomer unit, and a polymer block (B) mainly comprising a conjugated diene monomer unit.

The "conjugated diene monomer unit" refers to a structure resulting from the polymerization of one conjugated diene compound.

The conjugated diene compound is not particularly limited as long as the conjugated diene compound is diolefin having a conjugated double bond. Examples thereof include 1,3-butadiene, 2-methyl-1,3-butadiene (isoprene), 2,3-dimethyl-1,3-butadiene, 1,3-pentadiene, and 1,3-hexadiene.

Among them, the conjugated diene compound is preferably 1,3-butadiene or isoprene. Use of 1,3-butadiene is more preferred because the resulting viscous adhesive tends to be excellent in heat aging resistance and light resistance.

These conjugated diene compounds may be used singly or in combinations of two or more thereof.

The "vinyl aromatic monomer unit" refers to a structure resulting from the polymerization of one vinyl aromatic hydrocarbon compound.

Examples of the vinyl aromatic hydrocarbon compound include, but are not limited to: styrene; alkylstyrenes such as α-methylstyrene, p-methylstyrene and p-tertiary butylstyrene; alkoxystyrenes such as p-methoxystyrene; and vinylnaphthalene.

Among them, the vinyl aromatic hydrocarbon is preferably styrene.

These vinyl aromatic hydrocarbon compounds may be used singly or in combinations of two or more thereof.

The "polymer block (A) mainly comprising a vinyl aromatic monomer unit" refers to a polymer block in which the ratio of the vinyl aromatic monomer unit to the whole polymer block (A) is 50% by mass or more, preferably 70% by mass or more, more preferably 85% by mass or more, further preferably 95% by mass or more.

The "polymer block (B) mainly comprising a conjugated diene monomer unit" refers to a polymer block in which the ratio of the conjugated diene monomer unit to the whole polymer block (B) is more than 50% by mass, preferably 70% by mass or more, more preferably 85% by mass or more, further preferably 95% by mass or more.

The block ratio of vinyl aromatic hydrocarbon incorporated in the block copolymer is measured using a vinyl aromatic hydrocarbon polymer block component (except for a vinyl aromatic hydrocarbon polymer component having an average degree of polymerization of approximately 30 or less) by a method of oxidatively degrading a block copolymer with tertiary butyl hydroperoxide with osmium tetroxide as a catalyst (method described in I. M. KOLTHOFF, et al., J. Polym. Sci. 1, 429 (1946)), and can be determined according to the following expression:

Block ratio (% by mass) of vinyl aromatic hydrocarbon=(Mass of the vinyl aromatic hydrocarbon polymer block in the block copolymer/Mass of the total vinyl aromatic hydrocarbon in the block copolymer)×100

The block copolymer of the present embodiment is a block copolymer of an alternative embodiment comprising a polymer block (A) mainly comprising a vinyl aromatic monomer unit, and a polymer block (B) mainly comprising a conjugated diene monomer unit, and being represented by the following formula (a) and/or (b):

(A-B)$_n$—Y'     (a)

(B-A-B)$_n$—Y'     (b)

wherein n represents an integer of 1 to 4, and Y' represents a coupling agent residue from coupling of the block copolymer using a coupling agent having a structure represented by the following formula (Y1) or (Y2):

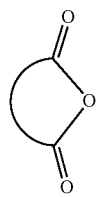

(Y1)

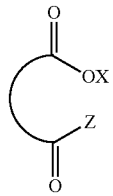

(Y2)

wherein each curved portion represents a saturated or unsaturated hydrocarbon group having 1 to 20 carbon atoms which is unsubstituted or optionally has a substituent, Z represents a functional group eliminable through coupling reaction, and X represents a group 1 element.

The compound of the general formula (Y1) is preferably a compound represented by the following general formula (Y-I), and the compound of the general formula (Y2) is preferably a compound represented by the following general formula (Y-II):

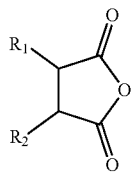

(Y-I)

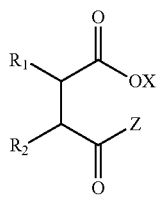

(Y-II)

wherein $R_1$ and $R_2$ each represent hydrogen or a saturated or unsaturated hydrocarbon group having 1 to 20 carbon atoms which is unsubstituted or optionally has a substituent, and $R_1$ and $R_2$ may be independent from each other or may together form a ring structure, Z represents a functional group eliminable through coupling reaction, and X represents a group 1 element.

The block copolymer is coupled using a modifying agent (or a coupling agent) having the structure represented by the formula (Y1) or (Y2) to obtain a molecule having coupling agent residue Y'. In this respect, Y' contains, in the molecule, a functional group capable of forming a complementary association state through a hydrogen bond, as shown in the general formulas (1), (2), (A1), and (A2). Hence, the block copolymer of the present embodiment has a tendency to improve tensile physical properties, to improve the holding power of a viscous adhesive composition containing the block copolymer of the present embodiment, and to improve the balance between the holding power and the melt viscosity thereof.

[Polymer Composition]

In the case of using the block copolymer of the present embodiment for viscous adhesive composition purposes, this block copolymer is preferably prepared into a polymer composition further containing a component having a different structure.

For example, a polymer composition comprising a block copolymer represented by the general formula (1), and a block copolymer represented by the general formula (2), or a polymer composition comprising a block copolymer represented by the general formula (A1), and a block copolymer represented by the general formula (A2) has a tendency to further improve mechanical physical properties, to improve the holding power of a viscous adhesive composition, and to improve the balance between the holding power and the melt viscosity thereof.

Preferably, the polymer composition of the present embodiment comprises a block copolymer represented by the general formula (1) and/or (2) or the general formula (A1) and/or (A2), and further contains a polymer represented by the following general formula (3) and/or (4):

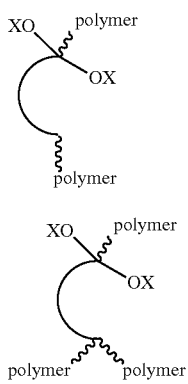

(3)

(4)

wherein each curved portion represents a saturated or unsaturated hydrocarbon group having 1 to 20 carbon atoms which is unsubstituted or optionally has a substituent, X represents a group 1 element, and "polymer" represents a polymer moiety.

The polymer of the general formula (3) is preferably a polymer represented by the following general formula (III), and the polymer of the general formula (4) is preferably a polymer represented by the following general formula (IV):

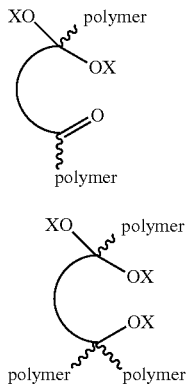

(III)

(IV)

In the formulas (III) and (IV), each curved portion represents a saturated or unsaturated hydrocarbon group having 1 to 20 carbon atoms which is unsubstituted or optionally has a substituent. X represents a group 1 element.

The polymer of the general formula (3) is preferably a polymer represented by the following general formula (iii), and the polymer of the general formula (4) is preferably a polymer represented by the following general formula (iv):

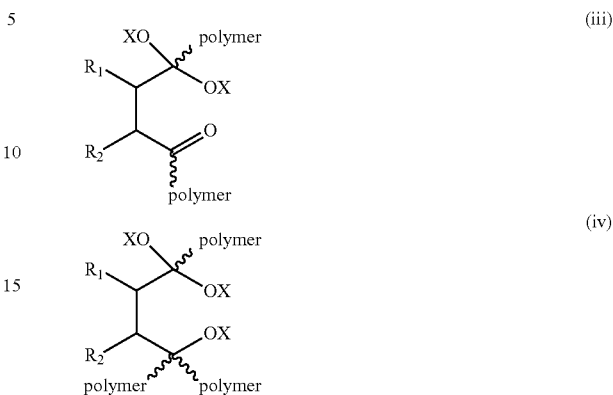

(iii)

(iv)

In the formulas (iii) and (iv), $R_1$ and $R_2$ each represent hydrogen or a saturated or unsaturated hydrocarbon group having 1 to 20 carbon atoms which is unsubstituted or optionally has a substituent, and $R_1$ and $R_2$ may be independent from each other or may together form a ring structure. X represents a group 1 element.

The polymer represented by the general formula (3) and/or the general formula (4), as compared with the block copolymer represented by the general formula (1) and/or the general formula (2) or the general formula (A1) and/or the general formula (A2), contains a functional group forming a weak hydrogen bond. Such a polymer cannot drastically improve mechanical strength or the holding power of a viscous adhesive composition at room temperature by itself, but tends to be effective for assisting in improvement in mechanical strength and the holding power of a viscous adhesive composition when added to the block copolymer represented by the general formula (1) and/or the general formula (2) or the general formula (A1) and/or the general formula (A2). Furthermore, the polymer, as compared with the block copolymer represented by the general formula (1) or (A1), has a large number of branches and thus facilitates exerting the effect of improving mechanical strength and the holding power of a viscous adhesive composition, and adjusting the balance between the holding power and the melt viscosity thereof.

The polymer represented by the general formula (3) and/or the general formula (4) is produced through or at the same time with the block copolymer represented by the general formula (1) and/or the general formula (2) or the general formula (A1) and/or the general formula (A2) in coupling the block copolymer using the coupling agent represented by the formula (Y1) or (Y2), and is therefore preferably contained in the polymer composition, also from the viewpoint that the polymer can be conveniently produced.

In the general formulas (i) to (iv), (Y-I), and (Y-II), each of $R_1$ and $R_2$ is hydrogen or a saturated or unsaturated hydrocarbon group having 1 to 20 carbon atoms which is unsubstituted or optionally has a substituent.

In this context, a saturated or unsaturated hydrocarbon group having 21 or more carbon atoms is not preferred from the viewpoint of productivity because coupling reaction is slow. The number of carbon atoms is preferably 20 or less, more preferably 15 or less, further preferably 10 or less, from the viewpoint of productivity.

Too small a number of carbon atoms makes it difficult to control the number of branches (the number of copolymer molecules reacted with the coupling agent). Specifically, the number of carbon atoms is preferably 1 or more, more preferably 3 or more, further preferably 5 or more, from the viewpoint of controlling the number of branches in the block copolymer of interest.

As mentioned above, the block copolymer of the present embodiment contains, in the molecule, a functional group capable of forming a complementary association state through a hydrogen bond. Therefore, it is considered that the block copolymer of the present embodiment effectively forms a hydrogen bond with a molecule other than oneself at room temperature and this hydrogen bond influences tensile strength or holding power, etc. in use for viscous adhesive purposes. Hence, the structures of other moieties are not limited as long as the block copolymer of the present embodiment has the structure mentioned above and satisfies the limitations on the number of carbon atoms from the viewpoint of a production process as mentioned above. For this reason, in the general formulas (i) to (iv), (Y-I), and (Y-II), each of $R_1$ and $R_2$ may be saturated hydrocarbon or unsaturated hydrocarbon, and may have a substituent or be unsubstituted. When $R_1$ or $R_2$ has a substituent, it may be preferred to have interaction with the hydrogen bond mentioned above. Therefore, the substituent can be appropriately selected in consideration of interaction with a carboxyl group, etc. Preferred examples of the substituent include a hydroxy group, a carboxyl group, an epoxy group, an amino group, a silanol group and an alkoxysilyl group.

In the formulas (i), (ii), (iii), (iv), (Y-I), and (Y-II), $R_1$ and $R_2$ may have structures different from each other or the same structures, and may form a ring structure where $R_1$ and $R_2$ are linked in a cyclic pattern.

When $R_1$ and $R_2$ have different structures, these structures can be preferably used as long as the number of carbon atoms in one of the structures falls within the range described above. In this case, in a preferred embodiment, the other moiety is hydrogen. The ring of the ring structure may be an alicyclic ring or may be an aromatic ring.

In the general formulas (1) to (4), (A1), (A2), and (Y2), X is a group 1 element.

Examples of the group 1 element include hydrogen, lithium, sodium, potassium, and rubidium. X is preferably hydrogen or lithium from the viewpoint of allowing the polymer of the present embodiment to effectively form a hydrogen bond.

For the polymer composition of the present embodiment, the content of the vinyl aromatic monomer unit in the polymer composition is preferably 5 to 60% by mass.

When the content of the vinyl aromatic monomer unit falls within the range described above, the balance between mechanical strength and elongation tends to be improved. The content of the vinyl aromatic monomer unit is preferably 5% by mass or more, more preferably 10% by mass or more, further preferably 15% by mass or more, still further preferably 25% by mass or more, even further preferably 30% by mass or more, particularly preferably 40% by mass or more, from the viewpoint of improving the holding power of a viscous adhesive composition.

The content of the vinyl aromatic monomer unit is preferably 60% by mass or less, more preferably 50% by mass or less, further preferably 45% by mass or less, still further preferably 40% by mass or less, even further preferably 30% by mass or less, particularly preferably 25% by mass or less, from the viewpoint of reducing the melt viscosity of a viscous adhesive composition.

In the case of preparing a viscous adhesive composition, the content of the vinyl aromatic monomer unit can be appropriately designed according to the required balance between holding power and melt viscosity. A small content of the vinyl aromatic monomer unit tends to reduce, particularly, melt viscosity, in a temperature zone around 100° C.

The content of the vinyl aromatic monomer unit in the polymer composition can be controlled by adjusting the amount of the vinyl aromatic monomer added in polymerization reaction for the block copolymer of the present embodiment.

The content of the vinyl aromatic monomer unit in the polymer composition can be measured by a method described in Examples mentioned later.

Preferably, the polymer composition of the present embodiment comprises at least one block copolymer in a monobranched form represented by the general formula (1) or (A1), or at least one block copolymer in a monobranched form represented by the general formula (a) or (b) wherein n is 1, and the number-average molecular weight of the monobranched form is 150,000 or lower.

A low number-average molecular weight of the block copolymer in a monobranched form tends to reduce the melt viscosity of a viscous adhesive composition. Hence, the number-average molecular weight of the block copolymer in a monobranched form is preferably 150,000 or lower, more preferably 120,000 or lower, further preferably 70,000 or lower, still further preferably 60,000 or lower, even further preferably 50,000 or lower.

On the other hand, too low a number-average molecular weight of the block copolymer in a monobranched form tends to deteriorate finishing properties at the time of production of the polymer composition of the present embodiment, or to reduce the holding power of a viscous adhesive composition. More specifically, the number-average molecular weight of the block copolymer in a monobranched form is effectively set to be low for reducing the viscosity of a viscous adhesive composition, whereas too low a number-average molecular weight tends to increase the stickiness of the polymer composition of the present embodiment, resulting in difficulty in forming pellets. Hence, the number-average molecular weight of the block copolymer in a monobranched form is preferably 30,000 or higher, more preferably 40,000 or higher, further preferably 50,000 or higher.

In the case of preparing a viscous adhesive composition, the number-average molecular weight of the block copolymer in a monobranched form can be appropriately designed according to the required balance between viscous adhesive characteristics and melt viscosity.

The number-average molecular weight of the block copolymer in a monobranched form contained in the polymer composition of the present embodiment can be controlled by adjusting polymerization conditions such as the amounts of the monomers added, polymerization temperature, and polymerization time in polymerization for the block copolymer.

In the polymer composition of the present embodiment, a large content of the block copolymer in a monobranched form tends to reduce the melt viscosity of a viscous adhesive composition, and to improve the peel strength thereof. From such a viewpoint, the content of the block copolymer in a monobranched form is preferably 10% by mass or more, more preferably 20% by mass or more, further preferably 40% by mass or more, still further preferably 60% by mass or more, based on the whole polymer composition.

A small content of the block copolymer in a monobranched form tends to improve the holding power of a viscous adhesive composition. Hence, the content of the block copolymer in a monobranched form is preferably 90% by mass or less, more preferably 80% by mass or less, further preferably 70% by mass or less, still further preferably 60% by mass or less, based on the whole polymer composition.

For purposes required to have high mechanical physical properties, such as sheet or film purposes, a lower content of the block copolymer in a monobranched form tends to further improve mechanical physical properties. Specifically, a higher content of a block copolymer in a dibranched form is more preferred. A block copolymer in a tribranched or higher branched form contained therein may improve mechanical physical properties even if the content of the block copolymer in a monobranched form is low. For such purposes, a larger content of a block copolymer in a dibranched form represented by the general formula (2) or the general formula (a) or (b) wherein n is 2 is more preferred, and the mass ratio of the content of the dibranched form to the content of the polymer in a monobranched form (amount of the dibranched form/amount of the monobranched form) is preferably 0.3 or more, more preferably 0.5 or more, further preferably 1 or more, still further preferably 2 or more.

For such purposes, a form totally free from the block copolymer in a monobranched form can also be preferably used.

In the case of preparing a viscous adhesive composition, the content of the monobranched form can be appropriately adjusted according to the required balance between viscous adhesive characteristics and melt viscosity.

For the polymer composition of the present embodiment, the viscosity at 25° C. of a solution of 25% by mass thereof in toluene is preferably 250 mPa·s or lower, more preferably 220 mPa·s or lower, further preferably 200 mPa·s or lower, still further preferably 180 mPa·s or lower, even further preferably 150 mPa·s or lower.

When the viscosity at 25° C. of a solution of 25% by mass of the polymer composition of the present embodiment in toluene falls within the range of 250 mPa·s or lower, the resulting viscous adhesive composition tends to have excellent viscous adhesive characteristics, solubility, coatability, and discharge stability.

For the polymer composition of the present embodiment, the viscosity at 25° C. of a solution of 25% by mass thereof in toluene is preferably 50 mPa·s or higher, more preferably 80 mPa·s or higher, further preferably 120 mPa·s or higher.

When the viscosity at 25° C. of a solution of 25% by mass of the polymer composition of the present embodiment in toluene falls within the range of 50 mPa·s or higher, the resulting viscous adhesive composition tends to be excellent in the balance between viscous adhesive characteristics and melt viscosity.

The viscosity at 25° C. of a solution of 25% by mass of the polymer composition in toluene can be controlled to the numeric range described above by adjusting the number-average molecular weight of the polymer, the content of the monobranched form, the content of vinyl aromatic hydrocarbon, etc.

For the polymer composition of the present embodiment, the viscosity at 25° C. of a solution of 15% by mass thereof in toluene is preferably 40 mPa·s or lower, more preferably 30 mPa·s or lower, further preferably 20 mPa·s or lower.

When the viscosity at 25° C. of a solution of 15% by mass of the polymer composition of the present embodiment in toluene falls within the range of 40 mPa·s or lower, the resulting viscous adhesive composition tends to have excellent viscous adhesive characteristics, solubility, coatability, and discharge stability.

For the polymer composition of the present embodiment, the viscosity at 25° C. of a solution of 15% by mass thereof in toluene is preferably 10 mPa·s or higher, more preferably 20 mPa·s or higher.

When the viscosity at 25° C. of a solution of 15% by mass of the polymer composition of the present embodiment in toluene falls within the range of 10 mPa·s or higher, the resulting viscous adhesive composition tends to be excellent in the balance between viscous adhesive characteristics and melt viscosity.

[Composition for Viscous Adhesive]

The composition for a viscous adhesive according to the present embodiment comprises the polymer composition of the present embodiment mentioned above.

The resulting viscous adhesive composition is excellent in the balance between melt viscosity, i.e., workability, and viscous adhesive characteristics.

The polymer composition of the present embodiment is excellent in the balance between viscous adhesive characteristics and melt viscosity and can therefore be preferably used as a material for the composition for a viscous adhesive. For the adjustment of the balance between viscous adhesive characteristics and melt viscosity, the composition for a viscous adhesive according to the present embodiment is preferably prepared as a polymer composition supplemented with an additional polymer other than the block copolymer of the present embodiment.

Specifically, polymer composition C1 of the present embodiment comprises a block copolymer represented by the general formula (1), (2), (A1), or (A2) and is obtained as a mixture of a polymer represented by the general formula (3) and/or (4), a polymer before coupling represented as "polymer" in the general formulas (1) to (4), a tetrabranched form, etc. in a production process. Depending on the purpose of the polymer, a mixture with a polymer and/or a polymer composition structurally different from polymer composition C1 of the present embodiment may be preferably used so as to reinforce and/or complement the performance of the polymer.

Examples of the polymer and/or polymer composition C2 structurally different from polymer composition C1 of the present embodiment include coupled polymers produced using a coupling agent structurally different from the compound of the formula (Y1) or (Y2), and linear polymers structurally different from "polymer" in the formulas (1) to (4).

When the polymer and/or polymer composition C2 is produced as a mixture with a polymer before coupling, the polymer and/or polymer composition C2 may be mixed in this mixture state containing the polymer and/or polymer composition C2 with polymer composition C1 or with a composition containing polymer composition C1 in the preparation of a viscous adhesive composition.

The additional polymer other than polymer composition C1 and/or polymer composition C2 is not particularly limited and is preferably a styrene-butadiene block copolymer, a styrene-isoprene block copolymer, or a composition containing the block copolymer.

Particularly, the presence of a block copolymer having high melt viscosity is preferred because the block copolymer can impart the effect of elevating melt viscosity while improving holding power to a viscous adhesive composition containing the polymer composition of the present embodiment.

The mixing ratio between polymer composition C1 and the polymer and/or polymer composition C2 is not particularly limited and can be appropriately set according to the purpose or the performance of each polymer. (Mass of C1)/((Mass of C1)+(Mass of C2)) is preferably 0.1 or more and 0.9 or less from the viewpoint of clearly exerting the effect of reinforcing and/or complementing functions by the mixing.

An exemplary concept of preparation of the composition for a viscous adhesive comprising polymer composition C1 and the polymer and/or polymer composition C2 will be described below.

Polymer composition C1 of the present embodiment has very high holding power at 40° C. and on the other hand, tends to not have high holding power at 60° C., though this differs depending on the structure of the "polymer" moiety in the general formulas (1) to (4), the structure of the curved portion, or the structure of $R_1$ and/or $R_2$ in the formulas (i), (ii), (iii), and (iv).

When improvement in holding power at 40° C. as well as holding power at 60° C. is desired for the composition for a viscous adhesive according to the present embodiment, mixing with the polymer and/or polymer composition C2 structurally different from polymer composition C1 tends to produce the desired characteristics. From such a viewpoint, preferred examples of the polymer and/or polymer composition C2 to be added include styrene-butadiene block copolymers and styrene-isoprene block copolymers having a larger vinyl aromatic monomer unit content than that of polymer composition C1, and styrene-butadiene block copolymers and styrene-isoprene block copolymers having a higher molecular weight than that of polymer composition C1.

Mass ratio A between polymer composition C1 and the polymer and/or polymer composition C2, (mass of C1)/((mass of C1)+(mass of C2)), can be appropriately designed according to the required balance between viscous adhesive characteristics and melt viscosity. Higher mass ratio A is more preferred because the balance between viscous adhesive characteristics and melt viscosity is improved.

The mass ratio A is preferably 0.1 or more, more preferably 0.2 or more, further preferably 0.5 or more, still further preferably 0.7 or more, even further preferably 0.8 or more.

A higher mass ratio of the additional polymer and/or polymer composition C2 tends to elevate the absolute value of holding power in a high-temperature zone on the order of, for example, 60° C. Therefore, the mass ratio A can be appropriately adjusted. From such a viewpoint, the mass ratio A is preferably 0.9 or less, more preferably 0.8 or less, further preferably 0.7 or less, still further preferably 0.6 or less.

[Viscous Adhesive Composition]

The viscous adhesive composition of the present embodiment contains 100 parts by mass of the composition for a viscous adhesive comprising the polymer composition of the present embodiment mentioned above, 50 to 400 parts by mass of a tackifier, and 10 to 150 parts by mass of a softener.

This viscous adhesive composition of the present embodiment is excellent in the balance between viscous adhesive characteristics and melt viscosity.

The content of the tackifier is preferably 100 to 380 parts by mass, more preferably 150 to 350 parts by mass.

The content of the softener is preferably 30 to 130 parts by mass, more preferably 70 to 120 parts by mass.

(Tackifier)

The tackifier constituting the viscous adhesive composition of the present embodiment can be variously selected depending on the purpose and required performance of the resulting viscous adhesive composition.

Examples of the tackifier include, but are not limited to, natural rosin, modified rosin, hydrogenated rosin, glycerol ester of natural rosin, glycerol ester of modified rosin, pentaerythritol ester of natural rosin, pentaerythritol ester of modified rosin, pentaerythritol ester of hydrogenated rosin, copolymers of natural terpene, ternary polymers of natural terpene, hydrogenated derivatives of copolymers of hydrogenated terpene, polyterpene resin, hydrogenated derivatives of phenolic modified terpene resin, aliphatic petroleum hydrocarbon resin, hydrogenated derivatives of aliphatic petroleum hydrocarbon resin, aromatic petroleum hydrocarbon resin, hydrogenated derivatives of aromatic petroleum hydrocarbon resin, cyclic aliphatic petroleum hydrocarbon resin, and hydrogenated derivatives of cyclic aliphatic petroleum hydrocarbon resin.

These tackifiers can be used singly or in combinations of two or more thereof.

A liquid-type tackifier may be used as the tackifier as long as the color of the tackifier is colorless to pale yellow and the tackifier has substantially no odor and has favorable heat stability.

Examples of the tackifier other than hydrogenated derivatives include, but are not limited to, aliphatic resins, alicyclic resins, polyterpene, natural and modified rosin esters, and mixtures thereof. Specific examples thereof include "Wingtack Extra" (trade name) manufactured by Sartomer USA, LLC, "Piccotac" (trade name) manufactured by Eastman Chemical Company, "Escorez" (trade name) manufactured by Exxon Mobil Corp., "Sylvagum" (trade name) and "Sylvalite" (trade name) manufactured by Arizona Chemical Holdings Corp., and "Piccolyte" (trade name) manufactured by Ashland Global Holdings Inc.

The tackifier is preferably a hydrogenated derivative from the viewpoint of stain resistance and low odor. Among others, hydrogenated dicyclopentadiene resin is particularly preferred. Examples of such a hydrogenated derivative include, but are not limited to, Arkon P100 (trade name) and Arkon M115 (trade name) manufactured by Arakawa Chemical Industries, Ltd., Clearon P135 (trade name) manufactured by Yasuhara Chemical Co., Ltd., and ECR5400 (trade name) manufactured by Exxon Mobil Corp.

When the viscous adhesive composition of the present embodiment needs to have high adhesiveness, resistance to time-dependent change in adhesive strength, or creep performance, etc., the viscous adhesive composition more preferably contains 20 to 75% by mass of a tackifier having affinity for a non-glass phase block (usually an intermediate block) of a block copolymer, and 3 to 30% by mass of a tackifier having affinity for a glass phase block (usually, an outside block) of a block polymer.

The tackifier having affinity for a glass phase block is preferably a tackifier of a terminal block. Examples of the tackifier mainly include aromatic resin homopolymers or copolymers containing vinyltoluene, styrene, α-methylstyrene, coumarone or indene. Among them, Kristalex or Plastolyn (manufactured by Eastman Chemical Company, trade name) containing α-methylstyrene is preferred. The content of the tackifier of a terminal block in the viscous adhesive composition is preferably in the range of 3 to 30% by mass, more preferably in the range of 5 to 20% by mass, further preferably in the range of 6 to 12% by mass.

When high initial adhesion strength, high wettability, low melt viscosity or high coatability of the viscous adhesive composition, discharge stability, etc. is necessary, the tackifier for use in the viscous adhesive composition is preferably petroleum resin having an aromatic content of 3 to 12% by mass. The aromatic content is more preferably 4 to 10% by mass. Particularly, hydrogenated petroleum resin is preferred.

(Softener)

Examples of the softener constituting the viscous adhesive composition of the present embodiment include, but are not limited to, oils, plasticizers, liquid tackifiers (having a ring-and-ball softening point lower than 30° C.), synthetic liquid oligomers, and mixtures thereof.

The softener is not particularly limited. For example, paraffin or naphthene process oil known in the art, or a mixed oil thereof can be used.

Examples of the commercially available product of the softener include, but are not particularly limited to, Diana Fresia S32 (trade name), Diana Process Oil PW-90 (trade name), and Process Oil NS100 (trade name) manufactured by Idemitsu Kosan Co., Ltd., White Oil Broom 350 (trade name) and DN Oil KP-68 (trade name) manufactured by Kukdong Oil & Chemicals Co., Ltd., Enerper M 1930 (trade name) manufactured by BP Chemicals, Inc., Kaydol (trade name) manufactured by Crompton Greaves, Primol 352 (trade name) manufactured by Exxon Mobil Corp., and KN4010 (trade name) manufactured by PetroChina Co., Ltd.

[Disposable Product]

The block copolymer of the present embodiment, and the polymer composition, the composition for a viscous adhesive, and the viscous adhesive composition comprising the block copolymer are suitably used in the production of disposable products.

Examples of the disposable product include, but are not particularly limited to, hygiene products such as paper diapers, sanitary napkins, and pet sheets.

Examples of the structure of the disposable product include, but are not particularly limited to, a form comprising a first constituent member, a second constituent member, and the viscous adhesive composition of the present embodiment, wherein the first constituent member and the second constituent member are allowed to adhere to each other through the viscous adhesive composition of the present embodiment.

Examples of the method for allowing two constituent members to adhere to each other using the viscous adhesive composition of the present embodiment as mentioned above include, but are not particularly limited to, a method comprising: a first step of first heating the viscous adhesive composition into a melted state; a second step of coating one of the constituent members with the viscous adhesive composition in a melted state; and a third step of laminating this constituent member with the other constituent member, followed by the solidification of the viscous adhesive composition by cooling so that the two constituent members adhere to each other.

Examples of the method for coating one of the constituent members with the viscous adhesive composition melted by heating include, but are not particularly limited to, spiral coating, omega coating, slot coater coating, roll coater coating, curtain spray coating, and dot coating. Among them, spiral coating, omega coating, or curtain spray coating is particularly preferred from the viewpoint of improving the texture of the disposable product.

Examples of the first constituent member and the second constituent member include, but are not particularly limited to, polyolefin resin films, nonwoven fabrics, woven fabrics, natural rubber, and hydrophilic porous base materials. Examples of the hydrophilic porous base material include porous base materials including cellulose or cotton, and hydrophilized porous base materials.

More specifically, the first constituent member is used as a top sheet and/or a back sheet; the second constituent member is used as a sheet-like absorber; and the viscous adhesive composition of the present embodiment is used as a hot-melt adhesive. The absorber and the top sheet and/or the back sheet are allowed to adhere to each other to form an absorbent article such as a diaper.

In this absorbent article, the top sheet can be formed from a base material having liquid permeability that permits a body fluid to move to the absorber. Examples thereof include top sheets formed from materials such as nonwoven fabrics such as thermal bonded nonwoven fabrics and spun bonded nonwoven fabrics, composite nonwoven fabrics of laminated thermal bonded and spun bonded nonwoven fabrics, opening films such as opening polyethylene films, foamed films such as polyethylene foam and urethane foam, and composite sheets of laminates thereof.

The top sheet may be surface-processed by embossing or boring in order to improve liquid permeability.

The basis weight of the top sheet is preferably 18 g/m$^2$ or more and 40 g/m$^2$ or less from the viewpoint of strength and workability. The shape of the top sheet is not particularly limited and can be a shape that covers the absorber so as to guide a body fluid into the absorber without leakage.

In a preferred embodiment, a plurality of protruding three-dimensionally shaped parts where the front-back direction of the absorbent article is a longitudinal direction are formed in the absorber, and the protruding three-dimensionally shaped parts and the top sheet are joined through the hot-melt adhesive. Such a configuration adopted further facilitates diffusing, in the front-back direction, a body fluid excreted onto the absorber while suppressing side leak in the width direction, and also maintains a good fit of the absorbent article.

The back sheet may be formed from the same material as that of the top sheet. The back sheet is preferably made of a base material having liquid impermeability that prevents a body fluid retained in the absorber from wetting clothes, and is formed from a material such as a resin film or a composite sheet of a resin film laminated with a nonwoven fabric.

The nonwoven fabric for use in the composite sheet is not particularly limited by its production method. Examples thereof include spun bonded nonwoven fabrics, melt-blown nonwoven fabrics, composite nonwoven fabrics of laminated spun bonded and melt-blown nonwoven fabrics or laminated spun bonded, melt-blown, and spun bonded nonwoven fabrics, and composite materials thereof.

Examples of the resin film include polyester, polyvinyl alcohol, polyethylene, polypropylene, and composite films of polyethylene and polypropylene.

The basis weight of the back sheet is preferably 15 g/m$^2$ or more and 40 g/m$^2$ or less from the viewpoint of strength and workability. For preventing sweating at the time of wearing, the back sheet preferably allows ventilation by adding a filler (e.g., calcium carbonate) to the resin film of the predetermined base material, or by processing the back sheet by embossing.

The absorber preferably contains an absorbable fiber as a base material, and a superabsorbent polymer (SAP). The absorbable fiber is not particularly limited as long as the absorbable fiber is generally used in absorbent articles such as sanitary napkins, paper diapers, or urine trap pads.

Examples thereof can include fluff pulp, cotton, rayon, acetate, tissue, absorbent paper, and hydrophilic nonwoven fabrics. The absorbable fiber of the absorber preferably has a basis weight of 100 g/m² or more and 800 g/m² or less without impairing absorption performance and texture.

The adsorbent polymer contained in the absorber is not particularly limited as long as the adsorbent polymer can absorb a body fluid and prevent back-flow. A sodium polyacrylate polymer, a polyaspartate polymer, or an adsorbent polymer formed from a material such as a (starch-acrylic acid) graft copolymer, an (acrylic acid-vinyl alcohol) copolymer, an (isobutylene-maleic anhydride) copolymer or a saponification product thereof can be used. Among them, a sodium polyacrylate polymer is preferred from the viewpoint of the amount of absorption per weight. The amount of SAP in the absorber is preferably a basis weight of 50 g/m² or more and 500 g/m² or less without impairing absorption performance and texture, and is preferably a content of 15% by mass or more and 50% by mass or less.

The structure of the absorber is preferably formed by mixing SAP particles into the absorbable fiber, or is preferably a SAP sheet of SAP particles fixed between filaments of the absorbable fiber. The absorber may be wrapped in a carrier sheet for the purpose of preventing the leakage of the SAP particles or stabilizing the shape of the absorber. In this case, the carrier sheet exposed on the surface and the top sheet and/or the back sheet are allowed to adhere to each other through the hot-melt adhesive.

A general method can be adopted as a method for producing the absorbent article. Examples thereof can include a production method comprising the steps of: (A) laminating the absorbable fiber with the adsorbent polymer so that an absorber mat is prepared to form an absorber; (B) fixing and integrating the top sheet and an elastic member forming a three-dimensional gather using the hot-melt adhesive; (C) coating the top sheet, the elastic member, and the inside of the back sheet with the hot-melt adhesive; (D) placing the top sheet above the absorber and the back sheet below the absorber on a collecting drum to fix and integrate these constituent members; and (E) cutting a half-finished product of an absorbent article into a product dimension using a cutter apparatus to separate individual absorbent articles.

[Methods for Producing Block Copolymer and Polymer Composition]

The methods for producing the block copolymer of the present embodiment, and the polymer composition containing the block copolymer are not particularly limited, and methods known in the art can be used.

Examples thereof include methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 51-49567, and Japanese Patent Laid-Open No. 59-166518.

The living end of the polymer obtained by any of these methods is subjected to addition reaction with a modifying agent mentioned later to obtain a modified polymer containing a functional group.

Hereinafter, the method for producing the polymer composition containing the block copolymer comprising a polymer block mainly comprising a vinyl aromatic monomer unit, and a polymer block mainly comprising a conjugated diene monomer unit will be illustrated.

Examples of the method for producing the polymer composition of the present embodiment include a method comprising: a polymerization step of copolymerizing a vinyl aromatic hydrocarbon compound such as styrene and a conjugated diene compound such as butadiene with an organolithium compound as a polymerization initiator in an inert hydrocarbon solvent to obtain a block copolymer; and a modification step (coupling step) of reacting the obtained block copolymer with a modifying agent (this compound is collectively referred to as a modifying agent when bonded to one or more polymers, and also referred to as a coupling agent when the modifying agent is bonded to two or more polymers).

In this case, the polymer composition of the present embodiment can be obtained by using, for example, a compound having a structure of the formula (Y1) or (Y2), as the coupling agent.

(Y1)

(Y2)

wherein each curved portion represents a saturated or unsaturated hydrocarbon group having 1 to 20 carbon atoms which is unsubstituted or optionally has a substituent, Z represents a functional group eliminable through coupling reaction, and X represents a group 1 element.

The general formula (Y1) is preferably represented by the following general formula (Y-I), and the general formula (Y2) is preferably represented by the following general formula (Y-II):

(Y-I)

(Y-II)

wherein $R_1$ and $R_2$ each represent hydrogen or a saturated or unsaturated hydrocarbon group having 1 to 20 carbon atoms which is unsubstituted or optionally has a substituent, and $R_1$ and $R_2$ may be independent from each other or may together form a ring structure, Z represents a functional group eliminable through coupling reaction, and X represents a group 1 element.

The course of forming each structure of the block copolymer contained in the polymer composition will be described. Use of the coupling agent represented by the general formula (Y1) or (Y2) forms a structure represented by the general formula (1) through the reaction of a polymer having an active end with a carbonyl moiety at the first stage.

At the second stage, the carbonyl moiety reacted at the first stage in the general formula (1) is further reacted with a polymer having an active end to form a structure represented by the general formula (2).

At the second stage, another carbonyl moiety unreacted at the first stage in the general formula (1) is further reacted with a polymer having an active end to form a structure represented by the general formula (3).

At the third stage, a remaining carbonyl moiety in the general formula (2) or the general formula (3) is further reacted with a polymer having an active end to form a structure represented by the general formula (4).

In the case of using the coupling agent represented by the general formula (Y1) or (Y2), a tetrabranched form is formed by the condensation or the like of two polymers having the structure of the general formula (2), and a polymer composition comprising such a tetrabranched form is preferred because the resulting viscous adhesive composition tends to exhibit high holding power.

As described above, the reaction with the coupling agent having the structure of the general formula (Y1) or (Y2) produces a mixture of a polymer containing one polymer chain bonded to the coupling agent, and a branched form containing two to four polymer chains bonded to the coupling agent. In the case of using the block copolymer of the present embodiment for viscous adhesive composition purposes, each of these components is capable of functioning in itself, whereas a polymer composition comprising a plurality of polymers having the structures tends to function as a preferred viscous adhesive composition with the balance between melt viscosity and holding power.

Examples of the coupling agent having the structure of the general formula (Y1) or (Y2) include, but are not particularly limited to, 4-methylhexahydrophthalic anhydride, methylbicyclo[2.2.1]heptane-2,3-dicarboxylic anhydride/bicyclo[2.2.1]heptane-2,3-dicarboxylic anhydride, bicyclo[2.2.1]heptane-2,3-dicarboxylic anhydride/bicyclo[2.2.1]heptane-2,3-dicarboxylic anhydride, octenylsuccinic anhydride, and 1,2,3,6-tetrahydrophthalic anhydride.

The modifying agent or the coupling agent that forms the block copolymer represented by any of the general formulas (1) to (4) through modification reaction and coupling reaction has the structure represented by the general formula (Y1), or a compound having a structure of the general formula (Y2) which is a structure where a —O— bond moiety in the formula (Y1) is ring-opened, a derivative thereof, or a modifying agent having one or more carboxyl groups and one or more ester groups in the molecule may be suitably used.

Examples of the modifying agent include general dicarboxylic acid compounds, acid anhydride compounds, diester compounds, and carboxylic acid ester compounds.

Examples of the dicarboxylic acid compound include succinic acid and maleic acid. Examples of the acid anhydride compound include succinic anhydride, maleic anhydride, phthalic anhydride, and octenylsuccinic anhydride.

The weight-average molecular weight of the polymer composition can be adjusted by controlling the amount of the polymerization initiator such as an organolithium compound added.

After the completion of polymerization reaction, coupling reaction is performed, and active species are deactivated by the addition of water, an alcohol, an acid, or the like. The polymerization solvent can be separated by, for example, steam stripping, followed by drying to obtain a polymer composition.

Examples of the polymerization method for the polymer composition include, but are not particularly limited to, polymerization methods such as coordination polymerization, anionic polymerization and cationic polymerization. Among them, anionic polymerization is preferred from the viewpoint of easy structural control. A method known in the art can be used as a method for producing a block copolymer component by the anionic polymerization. Examples thereof include, but are not particularly limited to, methods described in Japanese Patent Publication No. 36-19286, Japanese Patent Publication No. 43-17979, Japanese Patent Publication No. 46-32415, Japanese Patent Publication No. 49-36975, Japanese Patent Publication No. 48-2423, Japanese Patent Publication No. 48-4106, Japanese Patent Publication No. 56-28925, Japanese Patent Laid-Open No. 59-166518, and Japanese Patent Laid-Open No. 60-186577.

Examples of the inert hydrocarbon solvent for use in the polymerization step for the polymer composition include, but are not limited to, hydrocarbon solvents including: aliphatic hydrocarbons such as butane, pentane, hexane, isopentane, heptane, octane, and isooctane; alicyclic hydrocarbons such as cyclopentane, methylcyclopentane, cyclohexane, methylcyclohexane, and ethylcyclohexane; and aromatic hydrocarbons such as benzene, toluene, ethylbenzene, and xylene. Only one of these solvents may be used, or two or more thereof may be used as a mixture.

The organolithium compound for use as a polymerization initiator in the polymerization step for the polymer composition is not particularly limited, and a compound known in the art can be used. Examples thereof include ethyllithium, propyllithium, N-butyllithium, sec-butyllithium, tert-butyllithium, phenyllithium, propenyllithium, and hexyllithium. Particularly, n-butyllithium or sec-butyllithium is preferred.

Only one of these organolithium compounds may be used, or two or more thereof may be used as a mixture.

The method for producing the polymer composition of the present embodiment can optionally adopt the step of demineralizing metals derived from the polymerization initiator or the like.

The method for producing the polymer composition of the present embodiment may optionally further adopt the step of adding an antioxidant, a neutralizing agent, a surfactant, and the like.

Examples of the antioxidant include, but are not limited to, the same hindered phenol compounds, phosphorus compounds, and sulfur compounds as mentioned later.

Examples of the neutralizing agent include, but are not limited to, various stearic acid metal salts, hydrotalcite, and benzoic acid.

Examples of the surfactant include, but are not limited to, anionic surfactants, nonionic surfactants, and cationic surfactants. Examples of the anionic surfactant include, but are not limited to, fatty acid salts, alkylsulfuric acid ester salts, and alkylarylsulfonates. Examples of the nonionic surfactant include, but are not limited to, polyoxyethylene alkyl ethers and polyoxyethylene alkyl aryl ethers. Examples of the cationic surfactant include, but are not limited to, alkylamine salts and quaternary ammonium salts.

After the production of the polymer composition of the present embodiment as mentioned above, the isolation of the block polymer, i.e., finishing, is performed by a method mentioned later.

In the case of performing the polymerization step for the polymer composition in an inert hydrocarbon solvent, the polymer composition is isolated by the removal of the inert hydrocarbon solvent. Specific examples of the method for removing the solvent include steam stripping. Hydrated crumbs are obtained by the steam stripping, and the obtained hydrated crumbs can be dried to obtain a polymer composition. In the steam stripping, a surfactant is preferably used as a crumbing agent. Examples of such a surfactant include, but are not limited to, the same anionic surfactants, cationic surfactants, and nonionic surfactants as described above. The surfactant can generally be added at 0.1 to 3000 ppm to water in the stripping zone. In addition to the surfactant, a water-soluble salt of a metal such as Li, Na, Mg, Ca, Al, or Zn may be used as a dispersion aid for the crumbs.

The concentration of the crumb-like polymer composition dispersed in water, obtained through the polymerization step for the polymer composition and the steam stripping, is generally 0.1 to 20% by mass (ratio to water in the stripping zone). Within this range, crumbs having a favorable particle size can be obtained without hindering operation. It is preferred to dehydrate the crumbs of this polymer composition to adjust the water content to 1 to 30% by mass, followed by drying until the water content becomes 1% by mass or less. In the step of dehydrating the crumbs, dehydration in a compression water squeezer such as a roll, a Banbury dehydrator, or a screw extruder-type squeeze dehydrator, or simultaneous dehydration and drying in a box hot-wind conveyor dryer may be performed.

As mentioned above, the polymer is obtained by polymerization and then reacted with a coupling agent represented by the formula (Y1) or (Y2), or a modifying agent or a coupling agent having one or more carboxyl groups and one or more ester groups in the molecule, etc. to obtain the block copolymer of the present embodiment.

The block copolymer is produced as a mixture (polymer composition C1) of the polymer before coupling reaction and secondary reaction products in many cases and can be preferably used in this polymer composition state containing secondary reaction products for viscous adhesive composition purposes, etc.

On the other hand, depending on the use purpose of the viscous adhesive composition, polymer composition C1 of the present embodiment according to a preferred embodiment is mixed with an additional polymer and/or polymer composition C2 having a structure that reinforces and/or complements the performance of polymer composition C1.

Examples of such an embodiment include an embodiment in which polymer composition C1 that has high holding power at 40° C., but does not have high holding power at 60° C. is mixed with a polymer and/or polymer composition C2 having high holding power at 60° C. in order to complement the holding power of polymer composition C1.

In this case, the polymer and/or polymer composition C2 is preferably a polymer and/or a polymer composition obtained by reacting an aromatic vinyl polymer, or a copolymer comprising an aromatic vinyl monomer and a conjugated diene monomer with a coupling agent. Specifically, the polymer and/or polymer composition C2 which is a polymer and/or a polymer composition having a polymer structure and/or a modifying agent structure different from that of polymer composition C1, and is a mixture of a monobranched form (e.g., a diblock form) and di- to tetrabranched forms is capable of constituting a viscous adhesive composition having more preferred viscous adhesiveness, by selecting a polymer and/or polymer composition C2 capable of reinforcing and/or complementing the performance of polymer composition C1, because the polymer or polymer composition C2 alone can exert viscous adhesion performance.

The method for producing such a viscous adhesive composition is preferably, for example, a method of dry-blending pellets of polymer composition C1 with pellets of the polymer and/or polymer composition C2 having viscous adhesion performance, from the viewpoint of being capable of simply adjusting performance.

The mixing ratio between polymer composition C1 and the polymer and/or polymer composition C2 is not particularly limited and can be appropriately set according to the performance or purpose of each composition. The mixing is preferably performed at (mass of C1)/((mass of C1)+(mass of C2) of 0.1 or more and 0.9 or less from the viewpoint of clearly exerting the effect brought about by the mixing. The viscous adhesive composition may be supplemented with a tackifier, a softener, or the like, as mentioned above, in addition to the polymer compositions C1 and C2.

Examples

Hereinafter, the present embodiment will be described in more detail with reference to specific Examples and Comparative Examples. However, the present embodiment is not limited by Examples given below by any means.

In Examples and Comparative Examples, the characteristics or physical properties of polymers were measured by the methods described below.

[Measurement Method and Evaluation Method]
(Characteristics of Polymer Composition)
<Content of Vinyl Aromatic Monomer Unit (Styrene)>

A given amount of a thermoplastic elastomer was dissolved in chloroform, and the solution was measured with an ultraviolet spectrophotometer (manufactured by Shimadzu Corp., UV-2450). The content of the vinyl aromatic monomer unit (styrene) was calculated using a calibration curve from the peak intensity of an absorption wavelength (262 nm) attributed to the vinyl aromatic compound component (styrene).

<Number-Average Molecular Weight>

The number-average molecular weights of a monobranched form, a dibranched form, a tribranched form, and a tetrabranched form in a polymer were determined on the basis of a peak molecular weight in a chromatogram using a calibration curve (prepared using the peak molecular weight of standard polystyrene) determined from the measurement of commercially available standard polystyrene under measurement conditions mentioned later.

First, a single peak having the lowest peak top molecular weight in a molecular weight range of 20,000 or higher, and having an area ratio of 0.1 or more calculated by peak splitting mentioned later to the total peak area of the polymer composition was regarded as being from the monobranched form, and peaks in higher molecular weight ranges were regarded as being from the dibranched form, the tribranched form, and the tetrabranched form in the ascending order of their molecular weights.

The respective number-average molecular weights of the monobranched form, the dibranched form, the tribranched form, and the tetrabranched form were determined by vertical partitioning at each interpeak inflection point up to the baseline in a GPC curve using system software mentioned later.

In this context, the interpeak inflection point (inflection point) of the monobranched form, the dibranched form, the tribranched form, or the tetrabranched form was defined as the lowest point in the vertical direction (lowest point at the valley) between adjacent peaks.

When lowest points were consecutive, an intermediate point therebetween was used as the inflection point. From the inflection point mentioned above, vertical partitioning was performed using a waveform separation function included in the system software. After the partitioning, each number-average molecular weight and area ratio were calculated.

[Number-Average Molecular Weight Measurement Conditions]

GPC: ACQUITY APC System (manufactured by Waters Corp.)
System (measurement and analysis) software: EmpowEr3
Detector: RI
Refractive index unit full scale; 500 pRIU
Output full scale: 2000 mV
Sampling rate: 10 points/sEC
Colum:
ACQUITY APC XT125 (4.6 mm×150 mm); one
ACQUITY APC XT200 (4.6 mm×150 mm); one
ACQUITY APC XT900 (4.6 mm×150 mm); one
ACQUITY APC XT450 (4.6 mm×150 mm); one
Solvent: THF
Flow rate: 1.0 mL/min
Concentration: 0.1 mg/mL
Column temperature: 40° C.
Injection volume: 20 μL <Contents of Monobranched Form, Dibranched Form, Tribranched Form, and Tetrabranched Form>

The ratios of the areas of the monobranched form, the dibranched form, the tribranched form, and the tetrabranched form to the total peak area in an elution curve measured as described above were used as the contents of the monobranched form, the dibranched form, the tribranched form, and the tetrabranched form.

The area ratios and the number-average molecular weights of the monobranched form, the dibranched form, the tribranched form, and the tetrabranched form were determined by GPC measurement using the apparatus and the conditions mentioned above, followed by vertical partitioning at each interpeak inflection point up to the baseline in a GPC curve using the system software mentioned above.

In this context, the interpeak inflection point (inflection point) of the monobranched form, the dibranched form, the tribranched form, or the tetrabranched form was defined as the lowest point in the vertical direction (lowest point at the valley) between adjacent peaks. When lowest points were consecutive, an intermediate point therebetween was used as the inflection point. From the inflection point mentioned above, vertical partitioning was performed using a waveform separation function included in the system software. After the partitioning, each number-average molecular weight and area ratio were calculated.

In this context, the component corresponding to the monobranched form was regarded as comprising a polymer represented by the general formula (1); the component corresponding to the dibranched form was regarded as comprising a polymer represented by the general formula (2) or the general formula (3); and the component corresponding to the tribranched form was regarded as mainly comprising a polymer represented by the general formula (4), in the GPC measurement in light of the structure and putative reaction mechanism of the modifying agent used.

<Viscosity of Solution of 15% by Mass or 25% by Mass of Polymer Composition in Toluene>

The viscosity of a solution of 15% by mass or 25% by mass of the polymer composition in toluene was measured in a thermostat bath temperature-controlled to 25° C. using a Cannon-Fenske viscometer.

[Preparation of Viscous Adhesive Compositions of Examples 1 to 24 and Comparative Examples 1 to 4 and Measurement of Physical Properties]

(Preparation of Viscous Adhesive Composition)

100 parts by mass of each polymer composition (1 to 25), 300 parts by mass of Arkon M100 (manufactured by Arakawa Chemical Industries, Ltd.) as a tackifier, 100 parts by mass of Diana Process Oil PW-90 (manufactured by Idemitsu Kosan Co., Ltd.) as a softener, and 1 part by mass of 2-t-butyl-6-(3-t-butyl-2-hydroxy-5-methylbenzyl)-4-methylphenyl acrylate as a stabilizer were mixed, and melt-kneaded at 50 rpm at 180° C. for 30 minutes using a pressure-type kneader (model: DR0.5-3MB-E, Moriyama Co., Ltd.) to obtain a homogeneous hot-melt-type viscous adhesive composition. The viscous adhesive compositions of Examples 1 to 24 and Comparative Examples 1 to 4 were obtained using the predetermined polymer compositions 1 to 25.

In Examples 21, 22, and 23, Asaprene T439 (styrene-butadiene block copolymer; manufactured by Asahi Kasei Corp.), TAIPOL 4270 (styrene-butadiene block copolymer; manufactured by TSRC Corp.), or Quintac 3460 (styrene-isoprene block copolymer; manufactured by Zeon Corp.) was used as a polymer other than the polymer composition (1 to 25) in combination therewith.

(Measurement of Physical Properties of Viscous Adhesive Composition)

<Melt Viscosity of Viscous Adhesive Composition>

The melt viscosities of the viscous adhesive compositions of Examples 1 to 24 and Comparative Examples 1 to 4 were measured at temperatures of 100° C., 110° C., 120° C., 130° C., and 140° C. using a Brookfield viscometer (DV-III manufactured by Brookfield/AMETEK Inc.).

<Softening Point of Viscous Adhesive Composition>

The softening points of the viscous adhesive compositions were measured in accordance with JIS-K 2207.

Each sample was loaded to a prescribed ring table, which was horizontally supported in glycerin. In a state where 3.5 g of a ball was placed at the center of the sample for measurement, the temperature of the glycerin was elevated at a rate of 5° C./min. The temperature at which the sample came into contact with the bottom plate of the ring table due to the weight of the ball was measured as the softening point of the viscous adhesive composition.

(Preparation of Pressure-Sensitive Adhesive Tape)

Each melted viscous adhesive composition was cooled to room temperature and then dissolved in toluene to obtain a toluene solution.

A polyester film (Lumirror S10 manufactured by Toray Industries, Inc. (thickness: 50 μm)) was coated with the obtained toluene solution using an applicator, and then kept at room temperature for 30 minutes and in an oven of 70° C. for 7 minutes so that toluene was completely evaporated to prepare a pressure-sensitive adhesive tape.

The thickness of the coating was set to 50 μm (base material thickness: 50 μm).

<Viscous Adhesive Characteristics of Viscous Adhesive Composition—(1) (Loop Tack)>

Looped pressure-sensitive adhesive tapes of 250 mm in length×15 mm in width were prepared as mentioned above using the viscous adhesive compositions of Examples 1 to 24 and Comparative Examples 1 to 4.

Each looped pressure-sensitive adhesive tape was allowed to adhere to a SUS plate (SUS304) at a contact area of 15 mm×50 mm, an adhesion time of 3 sec, and an adhesion rate of 500 mm/min.

Then, the pressure-sensitive adhesive tape was peeled off from the SUS plate at a pulling rate of 500 mm/min, and its peel strength was measured.

<Viscous Adhesive Characteristics of Viscous Adhesive Composition—(2) (Peel Strength)>

Pressure-sensitive adhesive tapes of 25 mm in width were prepared as mentioned above using the viscous adhesive compositions of Examples 1 to 24 and Comparative Examples 1 to 4.

Each prepared pressure-sensitive adhesive tape was attached to a SUS plate (SUS304), and its 1800 peel strength was measured at a pulling rate of 300 mm/min.

<Viscous Adhesive Characteristics of Viscous Adhesive Composition—(3) (Holding Power at 40° C.)>

Pressure-sensitive adhesive tapes of 15 mm in width were prepared as mentioned above using the viscous adhesive compositions of Examples 1 to 24 and Comparative Examples 1 to 4.

Each prepared pressure-sensitive adhesive tape was attached to a SUS plate (SUS304) at a contact area of 15 mm×25 mm.

Then, a load of 1 kg was given in the vertical direction at 40° C. to the pressure-sensitive adhesive tape, and the holding time for the pressure-sensitive adhesive tape to fall off was measured.

<Viscous Adhesive Characteristics of Viscous Adhesive Composition—(4) (Holding Power at 60° C.)>

Pressure-sensitive adhesive tapes of 25 mm in width were prepared as mentioned above using the viscous adhesive compositions of Examples 1 to 24 and Comparative Examples 1 to 4.

Each prepared pressure-sensitive adhesive tape was attached to a SUS plate (SUS304) at a contact area of 25 mm×25 mm.

Then, a load of 1 kg was given in the vertical direction at 60° C. to the pressure-sensitive adhesive tape, and the holding time for the pressure-sensitive adhesive tape to fall off was measured.

<Balance Between Viscous Adhesive Characteristics and Melt Viscosity>

A value obtained by dividing holding power at 40° C. by melt viscosity at 100° C. (holding power at 40° C./melt viscosity at 100° C.) was calculated as an index for estimating the balance between viscous adhesive characteristics and melt viscosity.

This value equal to or more than 6.5 was determined as practically good balance performance, and this value equal to or more than 15.0 was determined as practically excellent performance.

<Melt Flow Rate>

Polymer compositions 15, 16, and 23 mentioned later were used as measurement subjects.

The melt flow rate (g/10 min) was measured using Melt Indexer L247 (Technol Seven Co., Ltd.) under conditions involving a measurement temperature of 200° C. and a load of 5.0 kg.

<Tensile Physical Properties (100% Modulus, 200% Modulus, 300% Modulus, Tensile Strength at Break, and Elongation)>

Polymer compositions 15, 16, and 23 mentioned later were used as measurement subjects.

The factors were indexed with the results of Example 25 defined as 100 in accordance with the tensile testing method of JIS K 6251.

[Preparation of Polymer Composition]

(Polymer Composition 1)

A stainless autoclave (internal capacity: 10 L) equipped with a stirrer and a jacket was washed, dried, purged with nitrogen, and charged with 5094 g of cyclohexane and 294 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 906 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.16 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 1 which was a block copolymer composition.

(Polymer Composition 2)

A stainless autoclave (internal capacity: 10 L) equipped with a stirrer and a jacket was washed, dried, purged with nitrogen, and charged with 5094 g of cyclohexane and 359 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 841 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.17 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-

6-methylphenol were added per 100 parts by mass of the block copolymer and thoroughly mixed.

Then, the solvent was removed by heating to obtain polymer composition 2 which was a block copolymer composition.

(Polymer Composition 3)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.14 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 3 which was a block copolymer composition.

(Polymer Composition 4)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.14 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 4 which was a block copolymer composition.

(Polymer Composition 5)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.14 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 5 which was a block copolymer composition.

(Polymer Composition 6)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.12 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 6 which was a block copolymer composition.

(Polymer Composition 7)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, methylbicyclo[2.2.1]heptane-2,3-dicarboxylic anhydride/bicyclo[2.2.1]heptane-2,3-dicarboxylic anhydride was added as a coupling agent at a molar ratio of 0.12 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 7 which was a block copolymer composition.

(Polymer Composition 8)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.12 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 8 which was a block copolymer composition.

(Polymer Composition 9)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket.

Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 1,2,3,6-tetrahydrophthalic anhydride was added as a coupling agent at a molar ratio of 0.12 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 9 which was a block copolymer composition.

(Polymer Composition 10)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.18 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 10 which was a block copolymer composition.

(Polymer Composition 11)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.08 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 11 which was a block copolymer composition.

(Polymer Composition 12)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 3.60 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.13 to the total number of moles of n-butyllithium, followed by coupling reaction for 25 minutes. An average reaction temperature during this reaction was 78° C. After 25 minutes from the addition of the coupling agent, the reaction was deactivated by the addition of 1.8 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 12 which was a block copolymer composition.

(Polymer Composition 13)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 1.92 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.12 to the total number of moles of n-butyllithium, followed by coupling reaction for 25 minutes. An average reaction temperature during this reaction was 78° C. After 25 minutes from the addition of the coupling agent, the reaction was deactivated by the addition of 0.96 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 13 which was a block copolymer composition.

(Polymer Composition 14)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.10 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 14 which was a block copolymer composition.

(Polymer Composition 15)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.08 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 15 which was a block copolymer composition.

(Polymer Composition 16)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.07 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 16 which was a block copolymer composition.

(Polymer Composition 17)

A stainless autoclave (internal capacity: 10 L) equipped with a stirrer and a jacket was washed, dried, purged with nitrogen, and charged with 5094 g of cyclohexane and 475 g of styrene produced in advance. The contents were warmed to 48° C. by passing hot water through the jacket. Subsequently, the polymerization of the styrene was started by the addition of a cyclohexane solution containing 1.80 g of n-butyllithium.

The liquid temperature was elevated by the polymerization of the styrene so that the reaction temperature reached the highest temperature of 53° C. After 5 minutes therefrom, a cyclohexane solution containing 725 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.07 to the total number of moles of n-butyllithium, followed by coupling reaction for 25 minutes. An average reaction temperature during this reaction was 78° C. After 25 minutes from the addition of the coupling agent, the reaction was deactivated by the addition of 0.9 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 17 which was a block copolymer composition.

(Polymer Composition 18)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.28 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.20 to the total number of moles of n-butyllithium, followed by coupling reaction for 25 minutes. An average reaction temperature during this reaction was 78° C. After 25 minutes from the addition of the coupling agent, the reaction was deactivated by the addition of 1.14 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 18 which was a block copolymer composition.

(Polymer Composition 19)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.28 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, methylbicyclo[2.2.1]heptane-2,3-dicarboxylic anhydride/bicyclo[2.2.1]heptane-2,3-dicarboxylic anhydride was added as a coupling agent at a molar ratio of 0.19 to the total number of moles of n-butyllithium, followed by coupling reaction for 25 minutes. An average reaction temperature during this reaction was 78° C. After 25 minutes from the addition of the coupling agent, the reaction was deactivated by the addition of 1.14 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 19 which was a block copolymer composition.

(Polymer Composition 20)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.28 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, octenylsuccinic anhydride was added as a coupling agent at a molar ratio of 0.20 to the total number of moles of n-butyllithium, followed by coupling reaction for 25 minutes. An average reaction temperature during this reaction was 78° C. After 25 minutes from the addition of the coupling agent, the reaction was deactivated by the addition of 1.14 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 20 which was a block copolymer composition.

(Polymer Composition 21)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.22 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, 4-methylhexahydrophthalic anhydride was added as a coupling agent at a molar ratio of 0.17 to the total number of moles of n-butyllithium, followed by coupling reaction for 25 minutes. An average reaction temperature during this reaction was 78° C. After 25 minutes from the addition of the coupling agent, the reaction was deactivated by the addition of 1.11 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 21 which was a block copolymer composition.

(Polymer Composition 22)

A stainless autoclave (internal capacity: 10 L) equipped with a stirrer and a jacket was washed, dried, purged with nitrogen, and charged with 5094 g of cyclohexane and 414 g of styrene produced in advance. The contents were warmed to 48° C. by passing hot water through the jacket. Subsequently, the polymerization of the styrene was started by the addition of a cyclohexane solution containing 1.98 g of n-butyllithium.

The liquid temperature was elevated by the polymerization of the styrene so that the reaction temperature reached the highest temperature of 53° C. After 5 minutes therefrom, a cyclohexane solution containing 786 g of 1,3-butadiene was added to the autoclave to continue polymerization. The butadiene was almost completely polymerized, and the reaction temperature reached the highest temperature of 78° C. After 3 minutes therefrom, ethyl benzoate was added as a coupling agent at a molar ratio of 0.16 to the total number of moles of n-butyllithium, followed by coupling reaction for 25 minutes. An average reaction temperature during this reaction was 78° C. After 25 minutes from the addition of the coupling agent, the reaction was deactivated by the addition of 0.99 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 22 which was a block copolymer composition.

(Polymer Composition 23)

A stainless autoclave (internal capacity: 10 L) equipped with a stirrer and a jacket was washed, dried, purged with nitrogen, and charged with 5094 g of cyclohexane and 442 g of styrene produced in advance. The contents were warmed to 48° C. by passing hot water through the jacket. Subsequently, the polymerization of the styrene was started by the addition of a cyclohexane solution containing 2.40 g of n-butyllithium.

The liquid temperature was elevated by the polymerization of the styrene so that the reaction temperature reached the highest temperature of 53° C. After 5 minutes therefrom, a cyclohexane solution containing 758 g of 1,3-butadiene was added to the autoclave to continue polymerization. The butadiene was almost completely polymerized, and the reaction temperature reached the highest temperature of 78° C. After 3 minutes therefrom, tetraethoxysilane was added as a coupling agent at a molar ratio of 0.07 to the total number of moles of n-butyllithium, followed by coupling reaction for 25 minutes. An average reaction temperature during this reaction was 78° C. After 25 minutes from the addition of the coupling agent, the reaction was deactivated by the addition of 1.2 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 23 which was a block copolymer composition.

(Polymer Composition 24)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.28 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, tetraethoxysilane was added as a coupling agent at a molar ratio of 0.20 to the total number of moles of n-butyllithium, followed by coupling reaction for 25 minutes. An average reaction temperature during this reaction was 78° C. After 25 minutes from the addition of the coupling agent, the reaction was deactivated by the addition of 1.14 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 24 which was a block copolymer composition.

(Polymer Composition 25)

A stainless autoclave (internal capacity: 10 L) equipped with a stirrer and a jacket was washed, dried, purged with nitrogen, and charged with 5094 g of cyclohexane and 503 g of styrene produced in advance. The contents were warmed to 48° C. by passing hot water through the jacket. Subsequently, the polymerization of the styrene was started by the addition of a cyclohexane solution containing 2.22 g of n-butyllithium.

The liquid temperature was elevated by the polymerization of the styrene so that the reaction temperature reached the highest temperature of 53° C. After 5 minutes therefrom, a cyclohexane solution containing 697 g of 1,3-butadiene was added to the autoclave to continue polymerization. The butadiene was almost completely polymerized, and the reaction temperature reached the highest temperature of 78° C. After 3 minutes therefrom, ethyl benzoate was added as a coupling agent at a molar ratio of 0.17 to the total number of moles of n-butyllithium, followed by coupling reaction for 25 minutes. An average reaction temperature during this reaction was 78° C. After 25 minutes from the addition of the coupling agent, the reaction was deactivated by the addition of 1.11 g of methanol.

To the obtained block copolymer solution, 0.75 parts by mass of octadecyl-3-(3,5-di-t-butyl-4-hydroxyphenyl) propionate and 0.15 parts by mass of 2,4-bis(octylthiomethyl)-6-methylphenol were added per 100 parts by mass of the block copolymer and thoroughly mixed.

Then, the solvent was removed by heating to obtain polymer composition 25 which was a block copolymer composition.

The structures and physical property values of the obtained polymer compositions 1 to 25 are shown in Tables 1 and 2 given below.

The names of the coupling agents used are shown in Table 3 given below.

TABLE 1

| | | Polymer composition | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Coupling agent | | 1 | 1 | 1 | 3 | 1 | 1 | 2 | 3 | 4 | 3 | 3 | 3 | 3 |
| Styrene content (mass %) | | 24.5 | 29.9 | 35.5 | 35.6 | 35.8 | 36.8 | 36.9 | 36.8 | 36.8 | 36.8 | 36.9 | 36.9 | 36.9 |
| Viscosity of 25 mass % solution in toluene (mPa·s) | | 188 | 401 | 198 | 189 | 212 | 200 | 195 | 197 | 198 | 410 | 142 | 129 | 467 |
| Viscosity of 15 mass % solution in toluene (mPa·s) | | 32 | 60 | 34 | 33 | 35 | 34 | 32 | 33 | 33 | 62 | 22 | 19 | 69 |
| Number-average molecular weight (ten thousands) | Monobranched form | 5.1 | 5.4 | 5.1 | 5.0 | 5.2 | 4.9 | 4.8 | 4.8 | 4.8 | 4.9 | 4.9 | 3.9 | 6.2 |
| | Dibranched form | 10.4 | 11.1 | 10.5 | 10.4 | 10.5 | 9.9 | 9.8 | 9.9 | 9.9 | 9.9 | 10.0 | 7.9 | 12.5 |
| | Tribranched form | 14.7 | 15.8 | 14.8 | 14.8 | 15.0 | 14.2 | 14.1 | 14.1 | 14.2 | 14.1 | 14.2 | 11.7 | 18.4 |
| | Tetrabranched form | 19.1 | 20.3 | 19.1 | 18.9 | 19.2 | 18.2 | 18.1 | 18.0 | 18.1 | 18.1 | 18.1 | 15.2 | 24.5 |
| Content (mass %) | Monobranched form | 64.0 | 53.0 | 63.2 | 63.8 | 63.5 | 63.7 | 63.8 | 63.5 | 63.6 | 44.9 | 77.2 | 63.2 | 63.7 |
| | Dibranched form | 27.2 | 16.3 | 15.0 | 14.4 | 14.9 | 10.8 | 10.9 | 10.9 | 10.8 | 13.0 | 5.8 | 11.0 | 10.8 |
| | Tribranched form | 6.3 | 21.7 | 18.1 | 18.2 | 18.1 | 17.0 | 16.7 | 16.9 | 16.9 | 26.7 | 11.8 | 16.9 | 17.0 |
| | Tetrabranched form | 2.5 | 9.0 | 3.7 | 3.6 | 3.5 | 8.5 | 8.6 | 8.7 | 8.7 | 15.4 | 5.2 | 8.9 | 8.5 |

TABLE 2

| | | Polymer composition | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Coupling agent | | 1 | 3 | 1 | 1 | 1 | 2 | 3 | 1 | 6 | 5 | 5 | 6 |
| Styrene content (mass %) | | 37.5 | 37.7 | 37.8 | 39.6 | 41.9 | 42.2 | 42.2 | 43.1 | 34.5 | 37.8 | 42.0 | 43.2 |
| Viscosity of 25 mass % solution in toluene (mPa·s) | | 305 | 156 | 173 | 392 | 306 | 288 | 301 | 277 | 292 | 188 | 304 | 171 |
| Viscosity of 15 mass % solution in toluene (mPa·s) | | 49 | 24 | 27 | 58 | 48 | 44 | 48 | 40 | 46 | 30 | 46 | 25 |
| Number-average molecular weight (ten thousands) | Monobranched form | 5.5 | 4.9 | 5.0 | 7.2 | 5.6 | 5.5 | 5.6 | 5.9 | 6.8 | 5.0 | 5.6 | 6.0 |
| | Dibranched form | 11.3 | 10.0 | 10.0 | 14.6 | 11.4 | 11.2 | 11.4 | 12.0 | 13.8 | 10.1 | 11.4 | 12.2 |
| | Tribranched form | 16.3 | 14.3 | 14.4 | 21.5 | 16.6 | 16.5 | 16.7 | 17.4 | — | 14.4 | 16.7 | — |
| | Tetrabranched form | 21.6 | 18.1 | 18.1 | 28.5 | 22.1 | 22.0 | 22.2 | 23.3 | — | 18.2 | 22.2 | — |

TABLE 2-continued

| | | Polymer composition | | | | | | | | | | | |
|---|---|---|---|---|---|---|---|---|---|---|---|---|
| | | 14 | 15 | 16 | 17 | 18 | 19 | 20 | 21 | 22 | 23 | 24 | 25 |
| Content (mass %) | Monobranched form | 68.2 | 77.0 | 77.6 | 80.4 | 53.4 | 55.0 | 54.2 | 63.1 | 67.7 | 78.0 | 53.6 | 65.2 |
| | Dibranched form | 7.6 | 5.7 | 4.2 | 6.3 | 34.6 | 34.2 | 34.6 | 32.4 | 32.3 | 1.1 | 35.1 | 34.8 |
| | Tribranched form | 13.7 | 12.1 | 11.5 | 10.8 | 6.7 | 6.6 | 6.6 | 3.8 | 0.0 | 11.5 | 6.6 | 0.0 |
| | Tetrabranched form | 10.5 | 5.2 | 6.7 | 2.5 | 5.3 | 4.2 | 4.6 | 0.7 | 0.0 | 9.4 | 4.7 | 0.0 |

TABLE 3

| | |
|---|---|
| Coupling agent 1 | 4-Methylhexahydrophthalic anhydride |
| Coupling agent 2 | Methylbicyclo[2.2.1]heptane-2,3-dicarboxylic anhydride/bicyclo[2.2.1]heptane-2,3-dicarboxylic anhydride |
| Coupling agent 3 | Octenylsuccinic anhydride |
| Coupling agent 4 | 1,2,3,6-Tetrahydrophthalic anhydride |
| Coupling agent 5 | Tetraethoxysilane |
| Coupling agent 6 | Ethyl benzoate |

The viscous adhesive compositions containing the polymer compositions thus obtained were evaluated by the methods described above.

The pressure-sensitive adhesive tapes mentioned above were also prepared and evaluated by the methods described above.

Further, the polymer compositions were evaluated by the methods described above.

These evaluation results are shown in Tables 4 to 6.

TABLE 4

| | | Example 1 | Example 2 | Example 3 | Example 4 | Example 5 | Example 6 | Example 7 | Example 8 |
|---|---|---|---|---|---|---|---|---|---|
| Polymer composition | Component | 1 | 2 | 3 | 4 | 5 | 6 | 7 | 8 |
| | Content (parts by mass) | 100 | 100 | 100 | 100 | 100 | 100 | 100 | 100 |
| | Component | — | — | — | — | — | — | — | — |
| | Content (parts by mass) | — | — | — | — | — | — | — | — |
| Tackifier (Arkon M100) | Content (parts by mass) | 300 | 300 | 300 | 300 | 300 | 300 | 300 | 300 |
| Softener (Diana Process Oil PW-90) | Content (parts by mass) | 100 | 100 | 100 | 100 | 100 | 100 | 100 | 100 |
| Viscous adhesive characteristics (adherend: SUS304) | peel strength (N/10 mm) | 13.2 | 15.1 | 13.4 | 13.3 | 13.3 | 13.6 | 13.5 | 13.5 |
| | Tackiness (loop tack) (N/15 mm) | 37.6 | 47.4 | 40.5 | 41.0 | 40.9 | 40.9 | 40.2 | 40.6 |
| | Holding power at 40° C. (min) | 86 | 206 | 268 | 270 | 268 | 294 | 285 | 292 |
| | Holding power at 60° C. (min) | 4 | 7 | 9 | 9 | 9 | 10 | 10 | 10 |
| Melt viscosity | 100° C. (Pa · s) | 12.3 | 29.0 | 13.1 | 13.0 | 13.0 | 15.1 | 15.1 | 15.0 |
| | 110° C. (Pa · s) | 5.6 | 13.8 | 6.1 | 6.0 | 6.0 | 6.8 | 6.9 | 6.8 |
| | 120° C. (Pa · s) | 3.0 | 7.5 | 3.3 | 3.2 | 3.1 | 3.7 | 3.8 | 3.7 |
| | 130° C. (Pa · s) | 1.7 | 4.5 | 2.0 | 1.9 | 1.8 | 2.2 | 2.2 | 2.2 |
| | 140° C. (Pa · s) | 1.2 | 2.8 | 1.3 | 1.2 | 1.2 | 1.5 | 1.4 | 1.4 |
| Softening point (° C.) | | 74.3 | 75.3 | 75.6 | 75.4 | 75.8 | 76.5 | 76.4 | 76.9 |
| Holding power at 40° C./melt viscosity at 100° C. | | 7.0 | 7.1 | 20.5 | 20.7 | 20.6 | 19.5 | 18.9 | 19.5 |

| | | Example 9 | Example 10 | Example 11 | Example 12 | Example 13 | Example 14 |
|---|---|---|---|---|---|---|---|
| Polymer composition | Component | 9 | 10 | 11 | 12 | 13 | 14 |
| | Content (parts by mass) | 100 | 100 | 100 | 100 | 100 | 100 |
| | Component | — | — | — | — | — | — |
| | Content (parts by mass) | — | — | — | — | — | — |
| Tackifier (Arkon M100) | Content (parts by mass) | 300 | 300 | 300 | 300 | 300 | 300 |
| Softener (Diana Process Oil PW-90) | Content (parts by mass) | 100 | 100 | 100 | 100 | 100 | 100 |
| Viscous adhesive characteristics (adherend: SUS304) | peel strength (N/10 mm) | 13.5 | 16.0 | 9.7 | 9.6 | 16.2 | 15.7 |
| | Tackiness (loop tack) (N/15 mm) | 40.4 | 47.4 | 39.1 | 39.0 | 47.3 | 45.6 |
| | Holding power at 40° C. (min) | 292 | 939 | 125 | 118 | 1162 | 421 |
| | Holding power at 60° C. (min) | 10 | 31 | 5 | 5 | 36 | 16 |
| Melt viscosity | 100° C. (Pa · s) | 15.1 | 49.9 | 12.9 | 12.2 | 53.6 | 26.4 |
| | 110° C. (Pa · s) | 6.9 | 22.1 | 5.8 | 5.4 | 24.6 | 13.3 |
| | 120° C. (Pa · s) | 3.8 | 8.9 | 2.8 | 2.6 | 9.3 | 5.8 |
| | 130° C. (Pa · s) | 2.2 | 5.1 | 1.7 | 1.5 | 5.4 | 2.8 |
| | 140° C. (Pa · s) | 1.5 | 3.0 | 1.1 | 1.0 | 3.2 | 1.7 |
| Softening point (° C.) | | 76.6 | 75.9 | 74.2 | 74.0 | 75.8 | 76.9 |
| Holding power at 40° C./melt viscosity at 100° C. | | 19.3 | 18.8 | 9.7 | 9.7 | 21.7 | 15.9 |

TABLE 5

|  |  | Example 15 | Example 16 | Example 17 | Example 18 | Example 19 | Example 20 | Example 21 | Example 22 | Example 23 |
|---|---|---|---|---|---|---|---|---|---|---|
| Polymer composition | Component | 15 | 16 | 17 | 18 | 19 | 20 | 21 | 8 | 8 |
|  | Content (parts by mass) | 100 | 100 | 100 | 100 | 100 | 100 | 100 | 80 | 80 |
|  | Component | — | — | — | — | — | — | — | T439 | 4270 |
|  | Content (parts by mass) | — | — | — | — | — | — | — | 20 | 20 |
| Tackifier (Arkon M100) | Content (parts by mass) | 300 | 300 | 300 | 300 | 300 | 300 | 300 | 300 | 300 |
| Softener (Diana Process Oil PW-90) | Content (parts by mass) | 100 | 100 | 100 | 100 | 100 | 100 | 100 | 100 | 100 |
| Viscous adhesive characteristics (adherend: SUS304) | peel strength (N/10 mm) | 9.7 | 9.8 | 16.1 | 16.0 | 16.1 | 16.2 | 14.7 | 14.4 | 13.5 |
|  | Tackiness (loop tack) (N/15 mm) | 39.1 | 39.5 | 47.2 | 47.1 | 46.9 | 47.0 | 42.6 | 40.8 | 41.2 |
|  | Holding power at 40° C. (min) | 135 | 133 | 629 | 586 | 564 | 601 | 632 | 260 | 241 |
|  | Holding power at 60° C. (min) | 6 | 6 | 18 | 18 | 17 | 18 | 20 | 13 | 12 |
| Melt viscosity | 100° C. (Pa · s) | 15.2 | 15.1 | 90.5 | 83.6 | 78.7 | 83.6 | 83.2 | 16.0 | 20.0 |
|  | 110° C. (Pa · s) | 6.5 | 6.5 | 20.3 | 19.4 | 18.4 | 19.0 | 17.9 | 7.0 | 8.8 |
|  | 120° C. (Pa · s) | 3.3 | 3.3 | 6.8 | 6.7 | 6.5 | 6.6 | 5.7 | 3.6 | 4.6 |
|  | 130° C. (Pa · s) | 2.0 | 2.1 | 3.6 | 3.4 | 3.3 | 3.4 | 3.0 | 2.2 | 2.7 |
|  | 140° C. (Pa · s) | 1.2 | 1.2 | 1.8 | 1.6 | 1.5 | 1.6 | 1.4 | 1.4 | 1.7 |
| Softening point (° C.) |  | 75.6 | 75.8 | 86.6 | 87.2 | 86.6 | 87.0 | 80.2 | 78.8 | 78.5 |
| Holding power at 40° C./melt viscosity at 100° C. |  | 8.9 | 8.8 | 7.0 | 7.0 | 7.2 | 7.2 | 7.6 | 16.3 | 12.1 |

|  |  | Example 24 | Comparative Example 1 | Comparative Example 2 | Comparative Example 3 | Comparative Example 4 |
|---|---|---|---|---|---|---|
| Polymer composition | Component | 8 | 22 | 23 | 24 | 25 |
|  | Content (parts by mass) | 80 | 100 | 100 | 100 | 100 |
|  | Component | Q3460 | — | — | — | — |
|  | Content (parts by mass) | 20 | — | — | — | — |
| Tackifier (Arkon M100) | Content (parts by mass) | 300 | 300 | 300 | 300 | 300 |
| Softener (Diana Process Oil PW-90) | Content (parts by mass) | 100 | 100 | 100 | 100 | 100 |
| Viscous adhesive characteristics (adherend: SUS304) | peel strength (N/10 mm) | 15.6 | 12.6 | 9.6 | 12.8 | 12.8 |
|  | Tackiness (loop tack) (N/15 mm) | 41.0 | 44.0 | 38.2 | 42.1 | 39.1 |
|  | Holding power at 40° C. (min) | 268 | 129 | 132 | 265 | 281 |
|  | Holding power at 60° C. (min) | 13 | 11 | 8 | 17 | 18 |
| Melt viscosity | 100° C. (Pa · s) | 22.0 | 58.0 | 22.1 | 85.7 | 59.0 |
|  | 110° C. (Pa · s) | 9.8 | 18.0 | 8.4 | 19.8 | 15.3 |
|  | 120° C. (Pa · s) | 5.1 | 7.7 | 4.2 | 6.8 | 5.9 |
|  | 130° C. (Pa · s) | 3.0 | 4.1 | 2.4 | 3.4 | 3.0 |
|  | 140° C. (Pa · s) | 1.3 | 2.5 | 1.4 | 1.6 | 1.7 |
| Softening point (° C.) |  | 79.0 | 86.0 | 80.5 | 87.1 | 86.0 |
| Holding power at 40° C./melt viscosity at 100° C. |  | 12.2 | 2.2 | 6.0 | 3.1 | 4.8 |

TABLE 6

|  |  | Example 25 | Example 26 | Comparative Example 5 |
|---|---|---|---|---|
| Polymer composition |  | 15 | 16 | 23 |
| Melt flow rate (g/10 min) |  | 120.6 | 130.1 | 127.0 |
| Tensile physical properties | 100% MO (MPa) | 100.00 | 97.15 | 99.00 |
|  | 200% MO (MPa) | 100.00 | 96.10 | 0.00 |
|  | 300% MO (MPa) | 100.00 | 93.68 | 0.00 |
|  | Tensile strength at break (MPa) | 100.00 | 93.07 | 115.73 |
|  | Elongation (%) | 100.00 | 99.67 | 34.65 |

As shown in Table 6, although the polymer compositions 15, 16, and 23 used in the evaluation in Examples 25 and 26 and Comparative Example 5 had a very similar polymer structure of a moiety other than the coupling agent residue, Examples 25 and 26 exhibited approximately 3 times the elongation of Comparative Example 5. These polymer compositions had equivalent stress (modulus) until break, demonstrating that the polymer compositions of Examples 25 and 26 exhibited excellent mechanical physical properties.

All the viscous adhesive compositions of Examples 1 to 21 had a value of holding power at 40° C./melt viscosity at 100° C. of 7.0 or more, demonstrating that these viscous adhesive compositions were excellent in the balance between viscous adhesive characteristics and melt viscosity.

Particularly, all the viscous adhesive compositions of Examples 3 to 10, 13, and 14 had a value of holding power at 40° C./melt viscosity at 100° C. of 15.0 or more, demonstrating that these viscous adhesive compositions had much better balance between viscous adhesive characteristics and melt viscosity.

The viscous adhesive compositions of Examples 6 to 10, 13, 14, and 17 to 21 were found to have much better holding power at 40° C.

The viscous adhesive compositions of Examples 1, 3 to 9, 11, 12, 15, and 16 were found to have much better melt viscosity at 100° C.

The viscous adhesive compositions of Examples 1 to 16 were found to have a much better softening point.

In Examples 22 to 24, the polymer composition 8 was supplemented with an additional polymer different therefrom. These compositions still exhibited a high value of holding power at 40° C./melt viscosity at 100° C., albeit decreased, and were found to be effective for improving holding power at 60° C.

The present application is based on Japanese Patent Application No. 2018-022184 filed in the Japan Patent Office on Feb. 9, 2018, the contents of which are incorporated herein by reference.

INDUSTRIAL APPLICABILITY

The block copolymer, the polymer composition, the composition for a viscous adhesive, and the viscous adhesive composition of the present invention have industrial applicability as a material for solution-type and hot-melt-type adhesives or pressure-sensitive adhesives.

The invention claimed is:

1. A block copolymer comprising
a polymer block (A) mainly comprising a vinyl aromatic monomer unit, and
a polymer block (B) mainly comprising a conjugated diene monomer unit,
the block copolymer being represented by the following general formula (1) or (2):

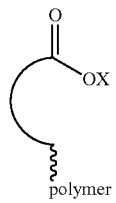

(1)

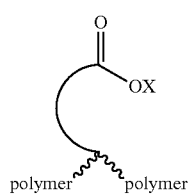

(2)

wherein each curved portion represents a saturated or unsaturated hydrocarbon group having 1 to 20 carbon atoms which is unsubstituted or optionally substituted with one or more of a hydroxy group, carboxyl group, epoxy group, amino group, silanol group and an alkoxysilyl group, X represents a group 1 element, and

represents a polymer moiety; and the polymer moiety being represented by at least one formula selected from the group consisting of (a) and (b):
(a) (the polymer block A-the polymer block B)$_n$-Y'
(b) (the polymer block B-the polymer block A-the polymer block B)$_n$-Y'
wherein n represents an integer of 1 to 4, and Y' represents a coupling agent residue from coupling of the block copolymer using 4-Methylhexahydrophthalic anhydride, Methylbicyclo[2.2.1]heptane-2,3-dicarboxylic anhydride/bicyclo[2.2.1]heptane-2,3-dicarboxylic anhydride, Octenylsuccinic anhydride, or 1,2,3,6-Tetrahydrophthalic anhydride.

2. A block copolymer comprising
a polymer block (A) mainly comprising a vinyl aromatic monomer unit, and
a polymer block (B) mainly comprising a conjugated diene monomer unit,
the block copolymer being represented by the following general formula (A1) or (A2):

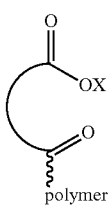

(A1)

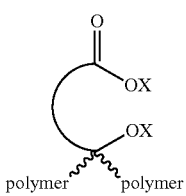

(A2)

wherein each curved portion represents a saturated or unsaturated hydrocarbon group having 1 to 20 carbon atoms which is unsubstituted or optionally substituted with one or more of a hydroxy group, carboxyl group, epoxy group, amino group, silanol group and an alkoxysilyl group, X represents a group 1 element, and

represents a polymer moiety; and
the polymer moiety being represented by at least one formula selected from the group consisting of (a) and (b):
(a) (the polymer block A-the polymer block B)$_n$-Y'
(b) (the polymer block B-the polymer block A-the polymer block B)$_n$-Y'
wherein n represents an integer of 1 to 4, and Y' represents a coupling agent residue from coupling of the block copolymer using 4-Methylhexahydrophthalic anhydride, Methylbicyclo[2.2.1]heptane-2,3-dicarboxylic anhydride/bicyclo[2.2.1]heptane-2,3-dicarboxylic anhydride, Octenylsuccinic anhydride, or 1,2,3,6-Tetrahydrophthalic anhydride.

3. A polymer composition comprising the block copolymer according to claim 1.

4. The polymer composition according to claim 3, further comprising a block copolymer represented by at least one general formula selected from the group consisting of (3), and (4):

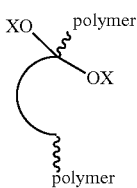

(3)

-continued

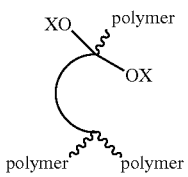   (4)

wherein each curved portion represents a saturated or unsaturated hydrocarbon group having 1 to 20 carbon atoms which is unsubstituted or optionally substituted with one or more of a hydroxy group, carboxyl group, epoxy group, amino group, silanol group and an alkoxysilyl group, X represents a group 1 element, and

represents a polymer moiety.

5. The polymer composition according to claim 3, wherein a content of the vinyl aromatic monomer unit in the polymer composition is 5 to 60% by mass.

6. The polymer composition according to claim 3, wherein
the polymer composition comprises at least one block copolymer in a monobranched form represented by the general formula (1), or at least one block copolymer in a monobranched form represented by the general formula (a) or (b) wherein n is 1, wherein
a number-average molecular weight of the block copolymer in a monobranched form is 150,000 or lower.

7. The polymer composition according to claim 6, wherein a content of the block copolymer in the monobranched form is 10% by mass to 90% by mass.

8. The polymer composition according to claim 3, wherein a viscosity at 25° C. of a solution of 25% by mass of the polymer composition in toluene is 250 mPa·s or lower.

9. The polymer composition according to claim 3, wherein a viscosity at 25° C. of a solution of 15% by mass of the polymer composition in toluene is 40 mPa·s or lower.

10. A composition for a viscous adhesive, comprising the polymer composition according to claim 4.

11. The composition for the viscous adhesive according to claim 10, wherein the composition contains
a first polymer composition, and
a second polymer composition other than the first polymer composition.

12. A viscous adhesive composition comprising
100 parts by mass of the composition for the viscous adhesive according to claim 10,
50 to 400 parts by mass of a tackifier, and
10 to 150 parts by mass of a softener.

13. A polymer composition comprising the block copolymer according to claim 2.

14. A polymer composition comprising the block copolymer according to claim 1.

15. The polymer composition according to claim 13, further comprising a polymer represented by at least one general formula selected from the group consisting of (3), and (4):

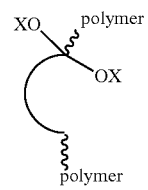   (3)

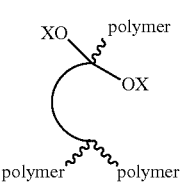   (4)

wherein each curved portion represents a saturated or unsaturated hydrocarbon group having 1 to 20 carbon atoms which is unsubstituted or optionally substituted with one or more of a hydroxy group, carboxyl group, epoxy group, amino group, silanol group and an alkoxysilyl group, X represents a group 1 element, and

represents a polymer moiety.

16. The polymer composition according to claim 14, further comprising a polymer represented by at least one general formula selected from the group consisting of (3), and (4):

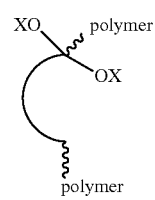   (3)

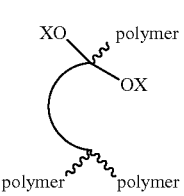   (4)

wherein each curved portion represents a saturated or unsaturated hydrocarbon group having 1 to 20 carbon atoms which is unsubstituted or optionally substituted with one or more of a hydroxy group, carboxyl group, epoxy group, amino group, silanol group and an alkoxysilyl group, X represents a group 1 element, and

represents a polymer moiety.

17. A polymer composition comprising the block copolymer according to claim 1, wherein the polymer composition has a value of holding power at 40° C./melt viscosity at 100° C. of 15.0 or more.

18. A polymer composition comprising the block copolymer according to claim 2, wherein the polymer composition has a value of holding power at 40° C./melt viscosity at 100° C. of 15.0 or more.

* * * * *